United States Patent
Srivastava

(10) Patent No.: US 10,083,147 B2
(45) Date of Patent: Sep. 25, 2018

(54) APPARATUSES AND METHODS FOR MULTILANE UNIVERSAL SERIAL BUS (USB2) COMMUNICATION OVER EMBEDDED UNIVERSAL SERIAL BUS (EUSB2)

(71) Applicant: Intel Corporation, Santa Clara, CA (US)

(72) Inventor: Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 15/396,376

(22) Filed: Dec. 30, 2016

(65) Prior Publication Data

US 2018/0189222 A1 Jul. 5, 2018

(51) Int. Cl.
*G06F 13/00* (2006.01)
*G06F 13/42* (2006.01)
*G06F 13/28* (2006.01)
*G06F 13/38* (2006.01)

(52) U.S. Cl.
CPC ........ *G06F 13/4282* (2013.01); *G06F 13/287* (2013.01); *G06F 13/387* (2013.01); *G06F 2213/0026* (2013.01); *G06F 2213/4002* (2013.01)

(58) Field of Classification Search
CPC .......................... G06F 13/4282; G06F 13/387
See application file for complete search history.

(56) References Cited

U.S. PATENT DOCUMENTS

| 2004/0168001 | A1 | 8/2004 | Szabelski | |
|---|---|---|---|---|
| 2007/0118674 | A1* | 5/2007 | Ulenas | G06F 13/387 710/305 |
| 2007/0239919 | A1 | 10/2007 | Kanai et al. | |
| 2009/0043925 | A1 | 2/2009 | Govindaraman | |
| 2015/0227489 | A1 | 8/2015 | Chen et al. | |
| 2015/0363349 | A1* | 12/2015 | Remple | G06F 13/426 710/313 |

(Continued)

OTHER PUBLICATIONS

International Search Report and Written Opinion for Application No. PCT/US2017/063931, dated Mar. 30, 2018, 11 pages.

*Primary Examiner* — Zachary K Huson
(74) *Attorney, Agent, or Firm* — Nicholson De Vos Webster & Elliott LLP

(57) ABSTRACT

Methods and apparatuses relating to circuitry for multilane serial bus communications are described. In an embodiment, an apparatus includes a serial bus controller, upstream serial bus lanes, a single downstream serial bus lane, and a host/device lane controller. The serial bus controller is to send and receive data transmissions to and from serial bus devices. The upstream serial bus lanes correspond to the serial bus devices and are associated with serial port addresses. The host/device lane controller is to receive data transmissions through the upstream serial bus lanes and includes a port address assignment circuit and a multiplexer. The port address assignment circuit is to assign serial port addresses to data transmissions, to be included in data transmissions to identify the upstream serial bus lanes through which the data transmission was received. The multiplexer is to forward data transmissions from upstream serial bus lanes to the downstream serial bus lane.

25 Claims, 19 Drawing Sheets

(56) References Cited

U.S. PATENT DOCUMENTS

2016/0110305 A1* 4/2016 Hundal ............... G06F 13/4022
                                                        710/316
2016/0162427 A1  6/2016 Kang et al.
2018/0032460 A1* 2/2018 Chuang ................ G06F 13/385
2018/0052799 A1* 2/2018 Shetty ................. G06F 13/4022

* cited by examiner

US 10,083,147 B2

APPARATUSES AND METHODS FOR MULTILANE UNIVERSAL SERIAL BUS (USB2) COMMUNICATION OVER EMBEDDED UNIVERSAL SERIAL BUS (EUSB2)

TECHNICAL FIELD

The disclosure relates generally to electronics, and, more specifically, an embodiment of the disclosure relates to multilane Universal Serial Bus (USB2) communication over embedded Universal Serial Bus (eUSB2).

BACKGROUND

Electronics (e.g., computer systems) generally employ one or more electrical connections to facilitate the transmittal of data (e.g., communication) between devices, such as between a computing system and a (e.g., external) peripheral.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1A:
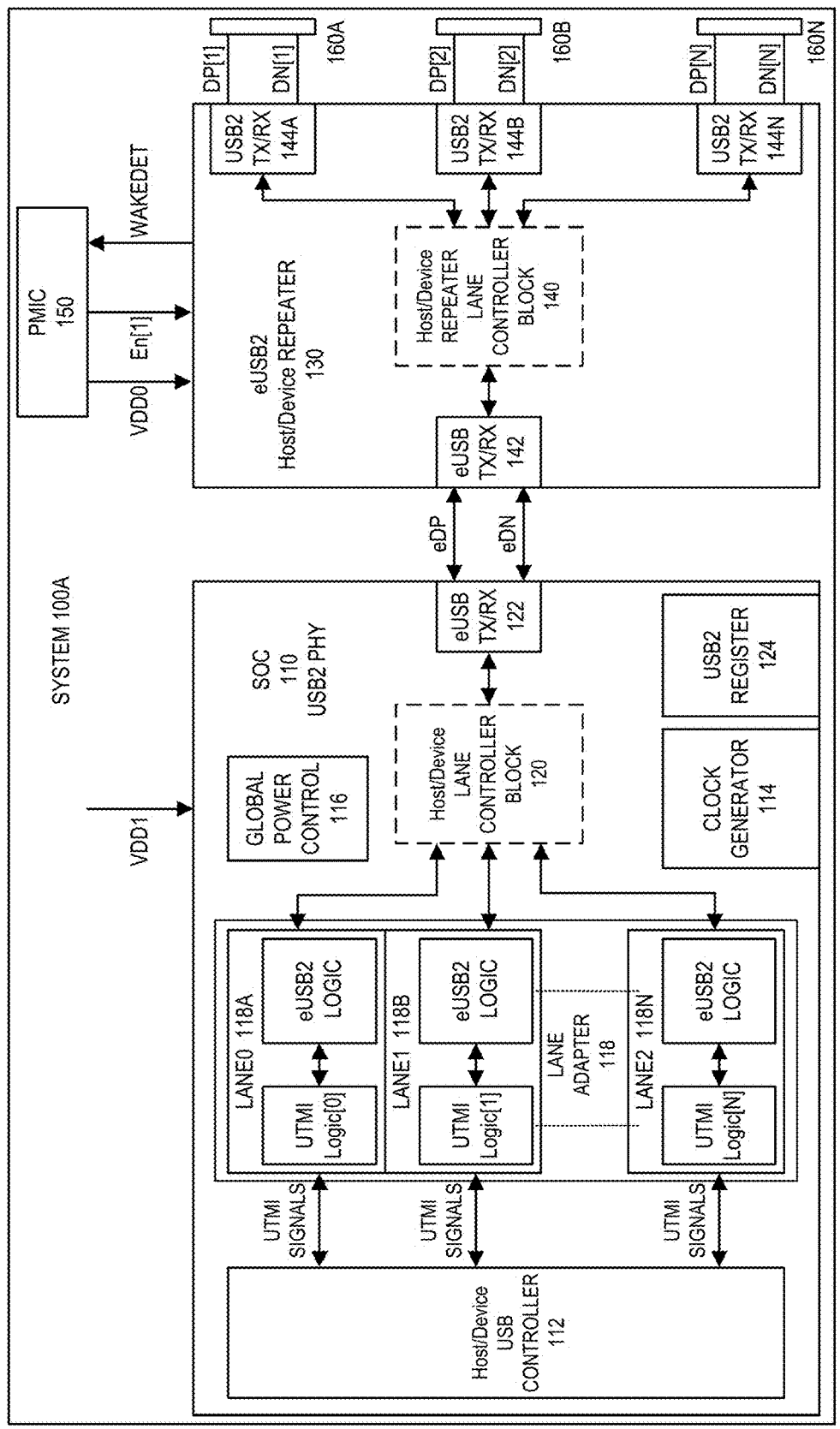
FIGS. 1A, 1B, 1C, and 1D illustrate systems including embodiments of the invention.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments, whether or not explicitly described.

Electronics (e.g., computing systems) generally employ one or more electrical couplings (e.g., wired or wireless connections) to facilitate the transmission and reception of data (e.g., communication) between devices (e.g., out-of-the-box communications), such as, but not limited to, between a computing system (e.g., a computer including a hardware processor) and a (e.g., external) peripheral. Non-limiting examples of peripherals are a keyboard, mouse, external storage device (e.g., hard disk drive), and mobile device (e.g., smartphone or tablet). Electronics (e.g., computing systems) also generally employ one or more electrical couplings (e.g., wired connections) to facilitate the transmission and reception of data (e.g., communication) within a device (e.g., inter-chip communications).

Certain electrical couplings (e.g., connections) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical coupling may generally refer to one or more connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) channel (e.g., single wire or fiber).

The phrase Universal Serial Bus (USB) generally refers to a specification(s) for a serial bus that supports the transmission and reception of data (and power and/or control) between a downstream facing port (e.g., a host) and an upstream facing port (e.g., device), for example, possibly through one or more hubs. In one embodiment, a USB specification is the USB 2.0 (e.g., USB2) specification released on Apr. 27, 2016 and Engineering Change Notices approved through Mar. 25, 2016 . In one embodiment, a USB specification is the USB 3.1 specification released on Jul. 26, 2015 and Engineering Change Notices approved through Sep. 12, 2016 . In one embodiment, a USB circuit (e.g., protocol layer thereof) communicates according to a first protocol.

The phrase embedded Universal Serial Bus (eUSB2) generally refers to a specification(s) for a serial bus that supports the transmission and reception of data (and power and/or control) between an eUSB2 downstream facing port (e.g., a host) and an upstream facing port (e.g., host re-driver/repeater) and also between a repeater downstream facing port (e.g., device re-driver/repeater) and eUSB2 upstream facing port (e.g., device) , for example, at a lower signal voltage than a USB specification. In one embodiment, in contrast to USB, eUSB2 provides one or more of: input/output (IO) power efficiency (e.g., to improve both the link active and idle power efficiency, process scalability (for example, to provide a low voltage USB (e.g., USB2.0) physical layer circuit (PHY) solution to lower the 3.3V IO signaling requirement, e.g., to a maximum of about 1.0V), implementation simplicity (for example, to reduce the PHY analog content) and support both USB (e.g., USB2.0) inter-chip and out-of-the-box devices (using a repeater to handle the high voltage requirement of USB2). In one embodiment, an eUSB2 device communicates with an USB device through a separate circuit referred to generally as a repeater, e.g., the eUSB2 device and the USB device are not electrically compatible.

In embodiments, a transceiver interface circuit communicates according a to USB (e.g., USB 2.0) Transceiver Macrocell Interface (UTMI) specification, for example, the USB 2.0 Transceiver Macrocell Interface (UTMI) specification, version 1.05, of Mar. 29, 2001 or the UTMI+ specification, revision 1.0, of Feb. 25, 2004.

In embodiment, an eUSB specification may enable future generation USB solutions where a host communicates to a device using a repeater (e.g., a re-driver and/or retimer) or through an eUSB2 device for embedded application. An eUSB2 PHY may include an analog front end circuit (e.g., to communicate with a separate device) and a logic layer circuit to communicate with a USB2 controller. A logic layer circuit may include a serial interface engine (SIE) and/or data recover circuit (DRC). An SIE may include a parallel-in data to serial-out data (PISO) converter and a serial-in data to parallel-out data (SIPO) converter. A controller may be a USB (e.g., USB2) controller of a device. A USB (e.g., USB2) PHY interface may include a USB controller using a transceiver interface (UTMI+) circuit.

Embodiments herein may include logic circuits to provide one or more of the following: control (e.g., high speed (HS)) transmittal and/or (e.g., HS) reception of serial communication to or from a (e.g., analog) front end circuit, reflect legacy USB (e.g., USB2) connection to UTMI+ (e.g., when eUSB2 connect handshake is detected), manage handshake to determine host/device operation with a repeater, convert legacy USB (e.g., USB2) port reset connection to eUSB2 port reset protocol, convert full speed (FS, e.g., 12 Mbits/s) and/or low speed (LS, e.g., 1.5 Mbits/s) transmittal of data and end of packet (EOP) data to eUSB2 single-ended data, detect eUSB2 disconnect through one (e.g., PING) protocol and convert to a different (e.g., UTMI) protocol, and manage link layer power management.

Embodiments may provide for reduced pin counts and associated costs in systems having multiple lane serial bus devices. Embodiments may provide for moving support for 3.3V USB devices to a component separate from an SoC which may include the USB controller. Embodiments may provide for modular design and development, including of lane controllers for hosts and repeaters. Embodiments may provide for re-use of existing eUSB2 protocol, USB, eUSB TX/RX (which runs much faster than eUSB2, and may be referred to as eUSB in this description), and other circuitry. Embodiments may provide for side communications (e.g., power management information) with any additional bus lanes.

Figure 1B:
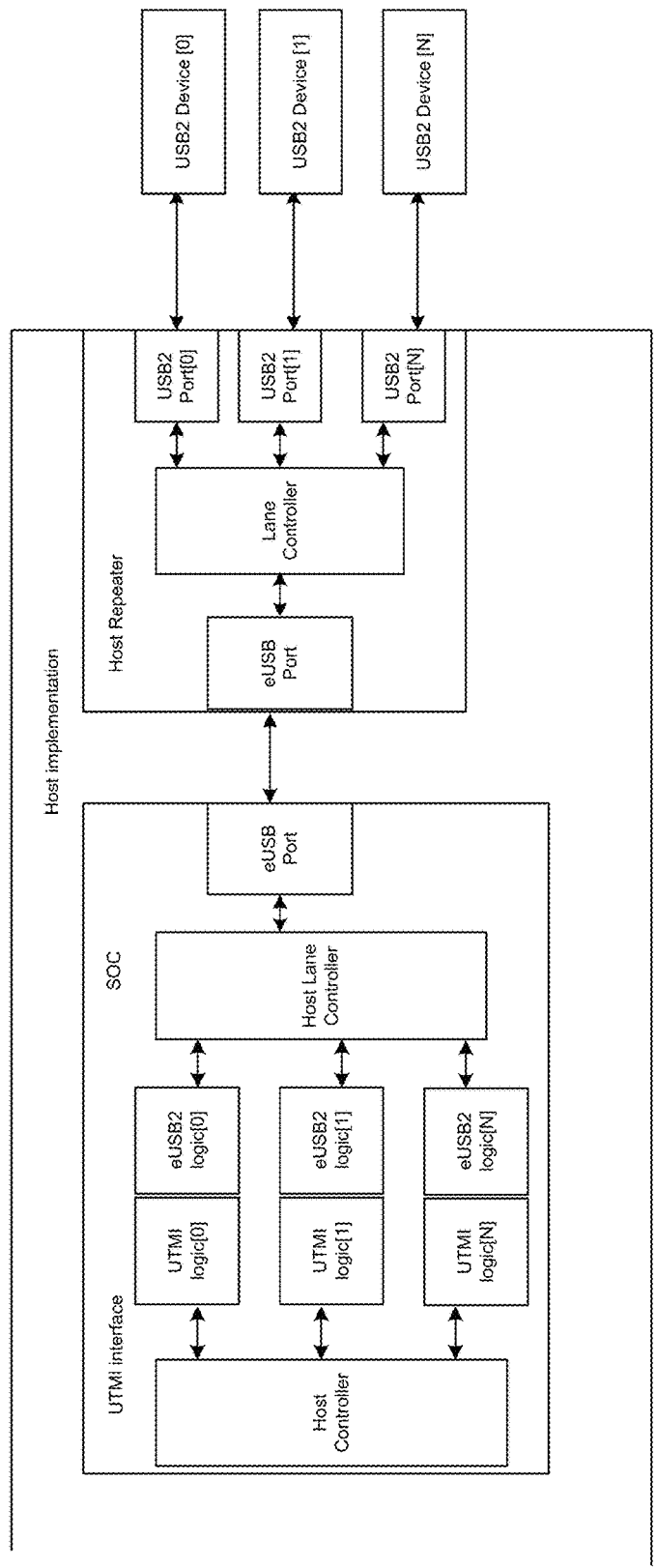
Figure 1C:
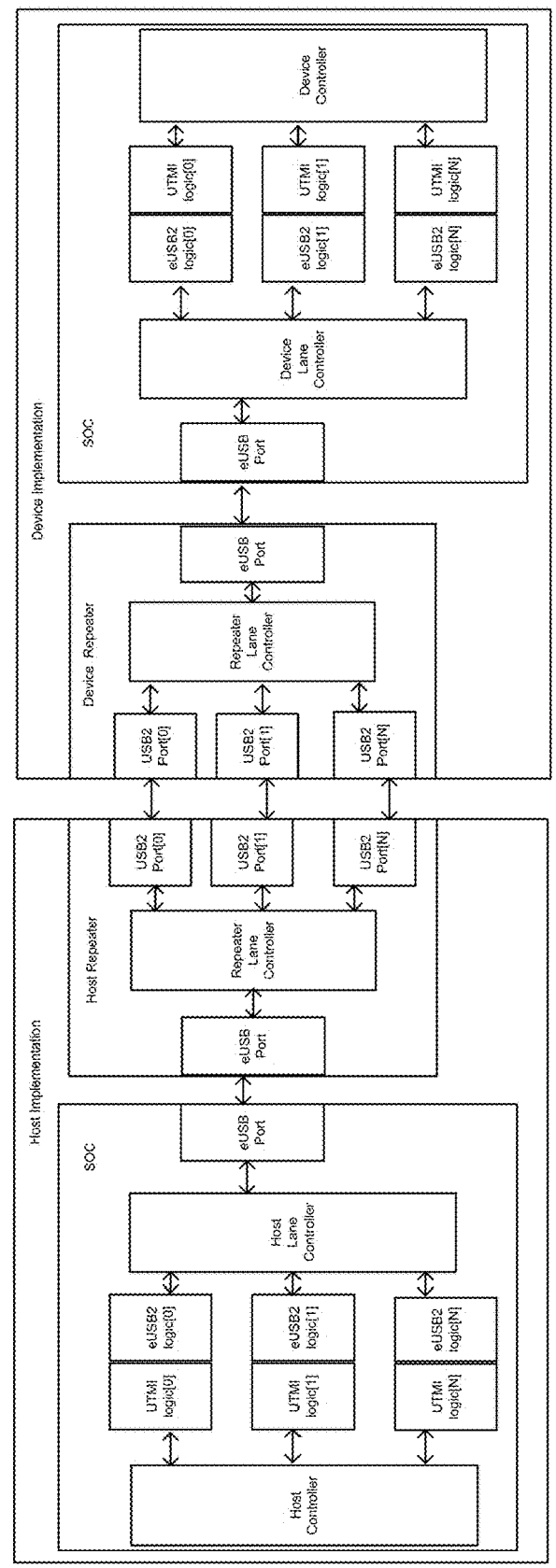
Figure 1D:
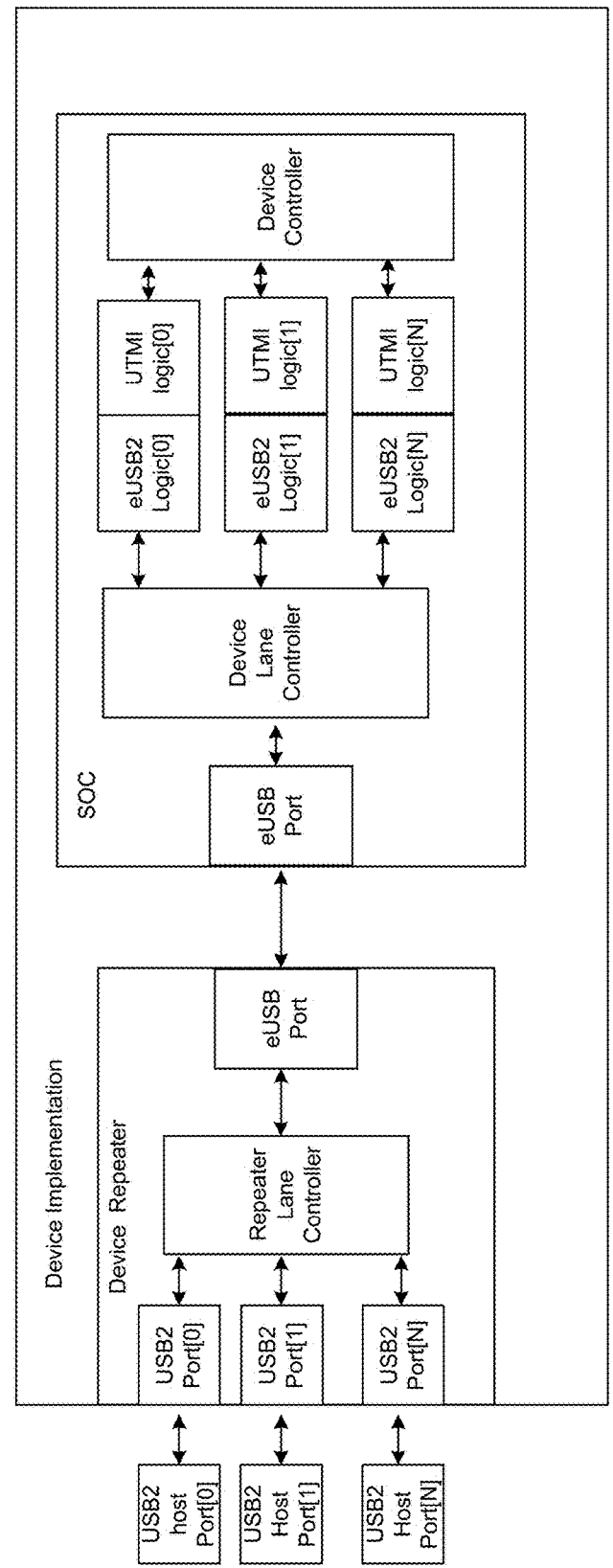

Turning now to the figures, FIGS. 1A, 1B, 1C, and 1D illustrate systems 100A, 100B, 100C, and 100D, respectively, including embodiments of the invention, showing the use of lane controllers according to embodiments. In FIG. 1A, an embodiment includes a system-on-a-chip (SoC) that may act as both a host and a device, and, as such, may be referred to as a dual-role device (DRD). In embodiments such as that of FIG. 1A, components and circuits may be referred to as host/device in order to indicate that they provide for implementations in which a DRD may act as a host and/or a device. For example, system 100A includes the use of a host/device lane controller in the SoC and in the repeater. In FIG. 1B, an embodiment includes an SoC that acts as a host. Therefore, system 100B includes the use of a host lane controller in the SoC and in the repeater. In FIG. 1C, an embodiment includes an SoC on the host side and an SoC on the device side, each side including eUSB2. Therefore, system 100C includes the use of a host lane controller in the SoC and in the repeater on the host side and a device lane controller in the SoC and in the repeater on the device side. In FIG. 1D, an embodiment includes an SoC on the device side. Therefore, system 100D includes the use of a device lane controller in the SoC and in the repeater on the device side. A more detailed description of the embodiment of FIG. 1A is provided below, but each of the other illustrated embodiments and various other embodiments are possible.

In FIG. 1A, system 100A includes SoC 110 and host/device repeater 130. SoC 110 represents a single semiconductor substrate, die, or chip on which any number of any types of information processors and/or processor cores may be integrated along with any number of cache memories, bus controllers, memory controllers, input/output controllers, and/or any other agents or components, also including, as shown, serial bus controller 112, clock generator 114, global power controller 116, lane adapter unit 118, host/device lane controller 120, very high speed serial bus eUSB transceiver port 122, and USB2 register 124, each as further described below. Host/device repeater 130 represents a serial bus repeater, re-driver, and/or re-timer and includes very high speed serial bus transceiver port 142, repeater lane controller 140, and USB serial bus ports 144 (144A, 144B, . . . 144N), each as described below.

System 100A, as shown in FIG. 1A, also includes power management integrated circuit (PMIC) 150 to control system power and serial bus connectors 160, which may refer collectively to any number of individual serial bus connectors 160A, 160B, . . . 160N. Each of serial bus connectors 160 may be a connector or receptacle providing for connection of an IO, peripheral, or other device to system 100A.

In an embodiment, each of serial bus connectors 160 may be a USB2 port having a pair of data lines DP (or D+) and DN (or D−). These and any other such data lines (including eDP (eD+) and eDN (eD−) shown in the figures and referred to in the description may be used to transmit/receive high speed serial data signals between an SOC as a host and host repeater (where the SOC host transceiver port is a downstream facing host port and the host repeater port is an upstream facing port), between a device repeater and a device SOC (where the device repeater port is a downstream facing port and the device SOC is an upstream facing port), or between a DRD SOC port and a DRD repeater (where the SOC port is a downstream facing port and the repeater port is an upstream facing port). Depending on the particular operating mode, whether communication data or control data, data may be transmitted/received on the data lines using high speed differential signaling, single ended communications, or some combination thereof. For example, while operating in high speed, differential signaling may be used to transmit/receive data, while single-ended communications may be used to transmit/receive control signals. While operating in low speed or full speed, single-ended serial communications may be used to transmit data and control signals (e.g., on eD+/eD− lines single ended). For example, an eD− line having data and an eD+ line (of a corresponding pair of lines) being idle may indicate full speed (FS) and the eD+ line having data and the eD− line being idle may indicate low speed (LS). The functions and behaviors of eD− and eD+ may vary depending on the data rate of the device. D+ may refer to positive about 3.3V and D− may refer to negative about 3.3V or low voltage signaling, according to the USB specification. eD+ may refer to positive about 1V, e.g., according to the eUSB2 specification. eD− may refer to negative about 1V or low voltage signaling. e.g., according to the eUSB2 specification.

Data transmissions through each of serial bus connectors 160 may be controlled by serial bus controller 112 in SoC 110. For example, serial bus controller (host/device) 112 may manage requests, data transfer, and other communication between system 100 and devices/host connected to serial bus connectors 160. In an embodiment, serial bus controller 112 may include a transceiver interface circuit (e.g., communicating according to the UTMI or UTMI+ protocol). Accordingly, serial bus controller 112 may be coupled to lane adapter unit 118 to transmit signals (e.g., UTMI signals) to any number of lanes, each corresponding to one of serial bus connectors 160A through 160N.

Lane adapter unit 118 may include and refer collectively to any number of individual adapter circuits 118A, 118B, . . . 118N, each corresponding to one of serial bus ports 160A to 160N. Each of adapter circuits 118 may include a serial interface engine (SIE) for translating USB information packets (e.g., to be used by a protocol layer), further including a serial-in, parallel-out (SIPO) converter for converting serial data (e.g., received by serial bus port 122) into parallel data (e.g., UTMI signals to serial bus controller 112) and a parallel-in, serial-out (PISO) converter for converting parallel data received (e.g., UTMI signals from serial bus controller 112) into serial data for transmission (e.g., through serial bus port 124). Accordingly, each lane of lane adapter unit 118 is coupled to host/device lane controller 120 (described below), which is coupled to serial high speed bus port 122.

Serial high speed bus port 122 includes a transmitter (low/high speed) to transmit high speed serial data and a high speed/low speed receiver to receive serial data. In an embodiment, serial bus port 122 may be an high speed eUSB port (high speed serial port) having a pair of data lines eDP (or eD+) and eDN (or eD−). As shown in FIG. 1A, serial bus port 122 is a downstream port coupled to an upstream port, high speed serial bus port 142 of repeater 130. Serial bus port 142 includes a transmitter to transmit serial data and a receiver to receive serial data and low speed transmitter for control signaling. In an embodiment, serial bus port 142 may be a high speed eUSB port having a pair of data lines eDP (or eD+) and eDN (or eD−). Note that in system 100A, SoC 110 is coupled to repeater 130 through a single pair of serial bus ports (downstream serial bus port 122 and upstream serial bus port 142), rather than multiple pairs of serial bus ports; however, embodiments of the invention provide for transmission of multiple lanes of serial bus data between SoC 110 and repeater 130.

In repeater 130, serial bus port 142 is coupled to repeater lane controller 140 (described below), which is coupled to serial bus ports 144. Serial bus ports 144 may include and refer collectively to any number of serial bus ports 144A, 144B, . . . 144N, each corresponding to one of serial bus connectors 160A to 160N. Each of serial bus ports 144 includes a transmitter to transmit serial data and a receiver to receive serial data. As shown in FIG. 1, each of serial bus ports 144 is a downstream port coupled to one of serial bus connectors 160. In an embodiment, serial bus ports 144 are USB2 ports having a pair of data lines DP (or D+) and DN (or D−).

Figure 2:
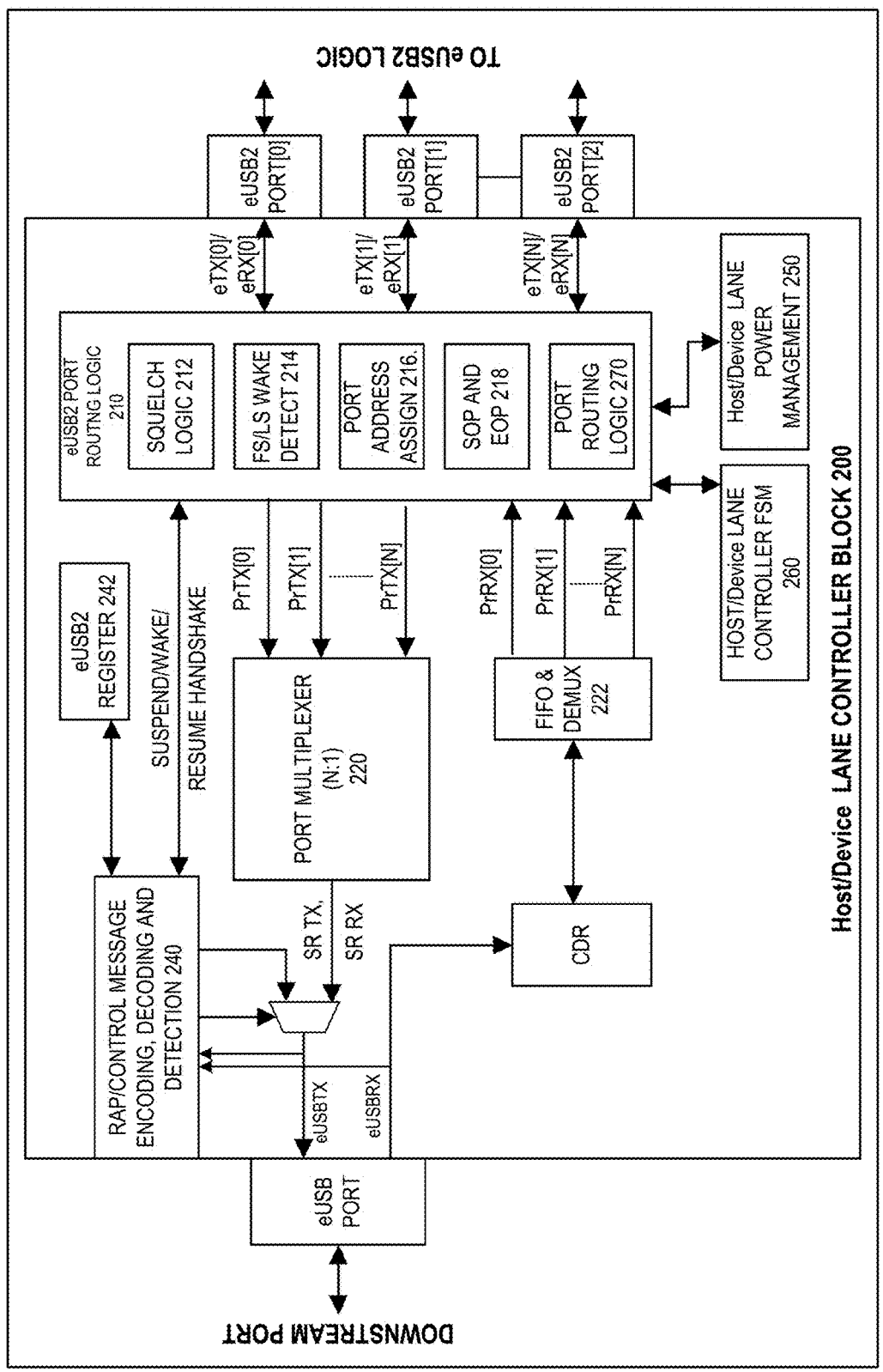
FIG. 2 illustrates a host/device lane controller according to an embodiment of the invention.

In SoC 110, host/device lane controller 120 includes circuits and hardware structures, including but not limited to any or all of those illustrated and/or described, to provide for multiple serial bus lanes to use a single downstream serial bus port 122. FIG. 2 illustrates a host lane controller, such as host lane controller 120, according to an embodiment of the invention. In FIG. 2, host lane controller 200 includes port router 210, port multiplexer 220, port demultiplexer 222, register access protocol (RAP) controller 240, register 242, lane power manager 250, and lane controller finite state machine (FSM) 260.

Port router 210 includes squelch circuit 212, wake circuit 214, port address assignment circuit 216, start-of-packet (SOP)/end-of-packet (EOP) circuit 218 and port routing circuit 270. Squelch circuit 212 is to detect squelch and determine whether to forward or suppress data signals. Wake circuit 214 is to detect wake events and forward indications of them to the host through the RAP. Port address assignment circuit 216 is to assign port addresses to downstream data transmissions and decode port addresses from upstream data transmissions. SOP/EOP circuit 218 is to add SOP and EOP messages to downstream data transmissions and strip them from upstream data transmissions. Port routing circuit 270 is to encode and decode port address assignment.

Port multiplexer 220 is to serialize data received from port router 210 such that the data from multiple lanes may be transmitted on a single lane. Port demultiplexer 222 is to demultiplex serialized data received from the single lane for transmission on multiple lanes. Port multiplexer is also to add port addresses along with the data to be forwarded to the host/device, and SOP and EOP for respective lanes in order to differentiate packets corresponding to different lanes.

RAP controller 240 is to encode and decode control messages received from the host, send status of the ports (e.g., suspend, resume, wake, disconnect) to the host through the serial bus lanes, and handle the link configuration initiated by the host. As such, RAP controller 240 is also to read and write to register 242.

Power manager 250 is to handle power management of the lanes, for example, through suspend/resume and power/clock gating of individual lanes.

Lane controller FSM 260 is to enable and control the operation of the other circuitry and hardware structures of host lane controller 200 to provide for multiple serial bus lanes to use a single downstream serial bus port.

Figure 3:
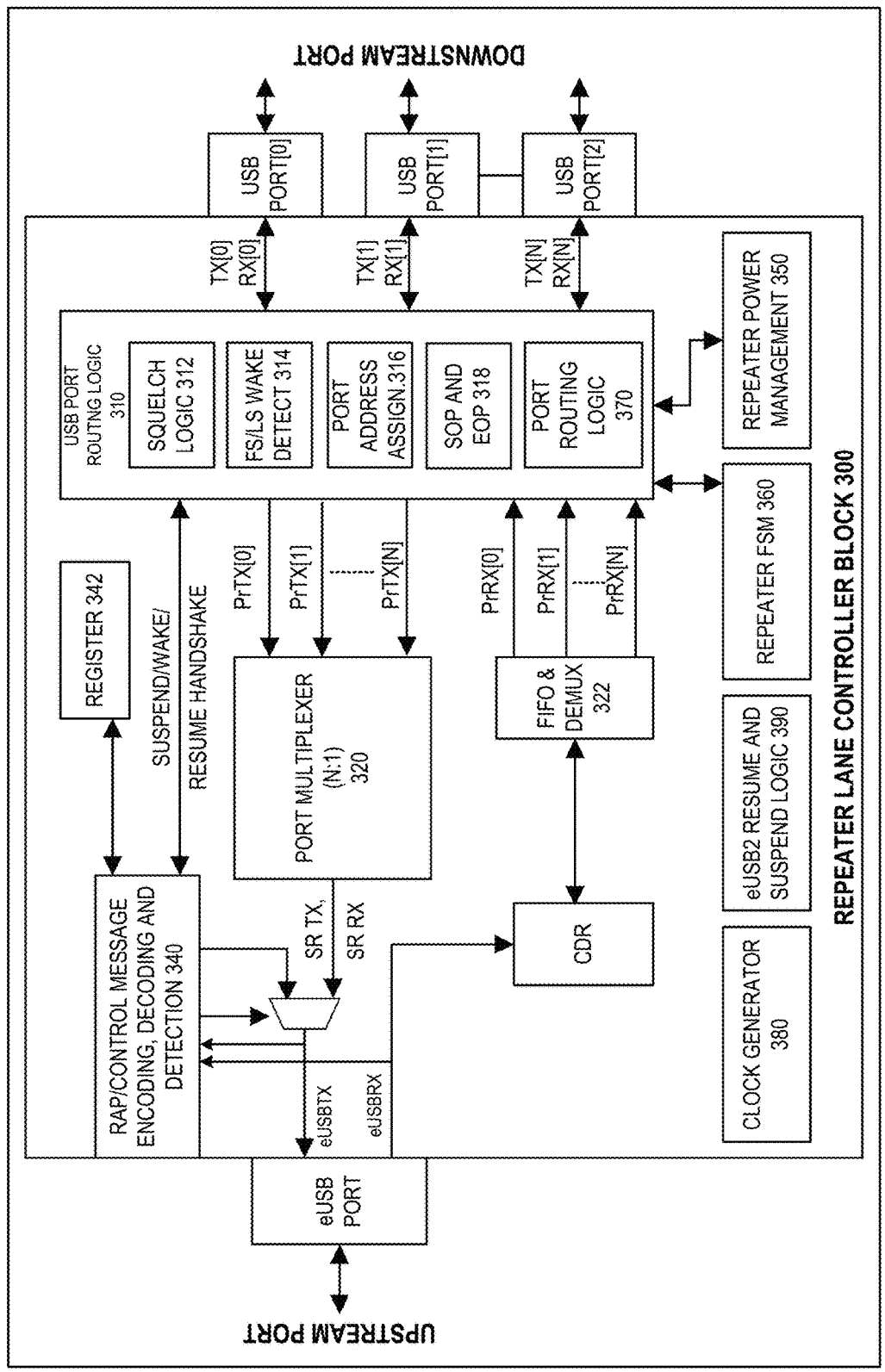
FIG. 3 illustrates a host/device repeater lane controller according to an embodiment of the invention.

In repeater 130, repeater lane controller 140 includes circuits and hardware structures, including but not limited to any or all of those illustrated and/or described, to provide for multiple serial bus lanes to use a single upstream serial bus port 142. FIG. 3 illustrates a repeater lane controller, such as repeater lane controller 140, according to an embodiment of the invention. In FIG. 3, repeater lane controller 300 includes port router 310, port multiplexer 320, port demultiplexer 322, RAP controller 340, register 342, lane power manager 350, lane controller FSM 360, clock generator 380, and suspend/resume circuit 390.

Port router 310 includes squelch circuit 312, wake circuit 314, port address assignment circuit 316, SOP/EOP circuit 318 and port routing circuit 370. Squelch circuit 312 is to detect squelch and determine whether to forward or suppress data signals. Wake circuit 314 is to detect wake events and forward indications of them to the host through the RAP. Port address assignment circuit 316 is to assign port addresses to upstream data transmissions and decode port addresses from downstream data transmissions. SOP/EOP circuit 318 is to add SOP and EOP messages to upstream data transmissions and strip them from downstream data transmissions. Port routing circuit is to add port assignments and decode port addresses for each packet forwarded or received to or from lanes.

Port multiplexer 320 is to serialize data received from port router 310 such that the data from multiple lanes may be transmitted on a single lane. Port demultiplexer 322 is to demultiplex serialized data received from the single lane for transmission on multiple lanes. Port Multiplexor also to assign and strip port addresses to and from each packet transmitted and received and also to add SOP/EOP for each respective lanes.

RAP controller 340 is to encode and decode control messages received from the host, send status of the ports (e.g., suspend, resume, wake, disconnect) to the host through the serial bus lanes, and handle the link configuration initiated by the host. As such, RAP controller 340 is also to read and write to register 342.

Power manager 350 is to handle power management of the lanes, for example, through suspend/resume and power gating of individual lanes.

Lane controller FSM 360 is to enable and control the operation of the other circuitry and hardware structures of repeater lane controller 300 to provide for multiple serial bus lanes to use a single upstream serial bus port.

Clock generator 370 is to generate a clock signal for repeater lane controller 300, and suspend/resume circuit 380 is to handle power management of repeater lane controller 380. Note that no clock generator or suspend resume circuit is shown in host lane controller 200 because their functions may be performed for a host lane controller by clock generator 114 and global power controller 116, respectively, as shown in FIG. 1A, in connection with performing those functions for SoC 100A.

Further note that, for convenience, some circuits and hardware structure, such as serial bus ports and registers, may be shown in both FIG. 1A and FIG. 2 or 3; however, this does not imply that redundant hardware is desired or necessary.

Figure 4:
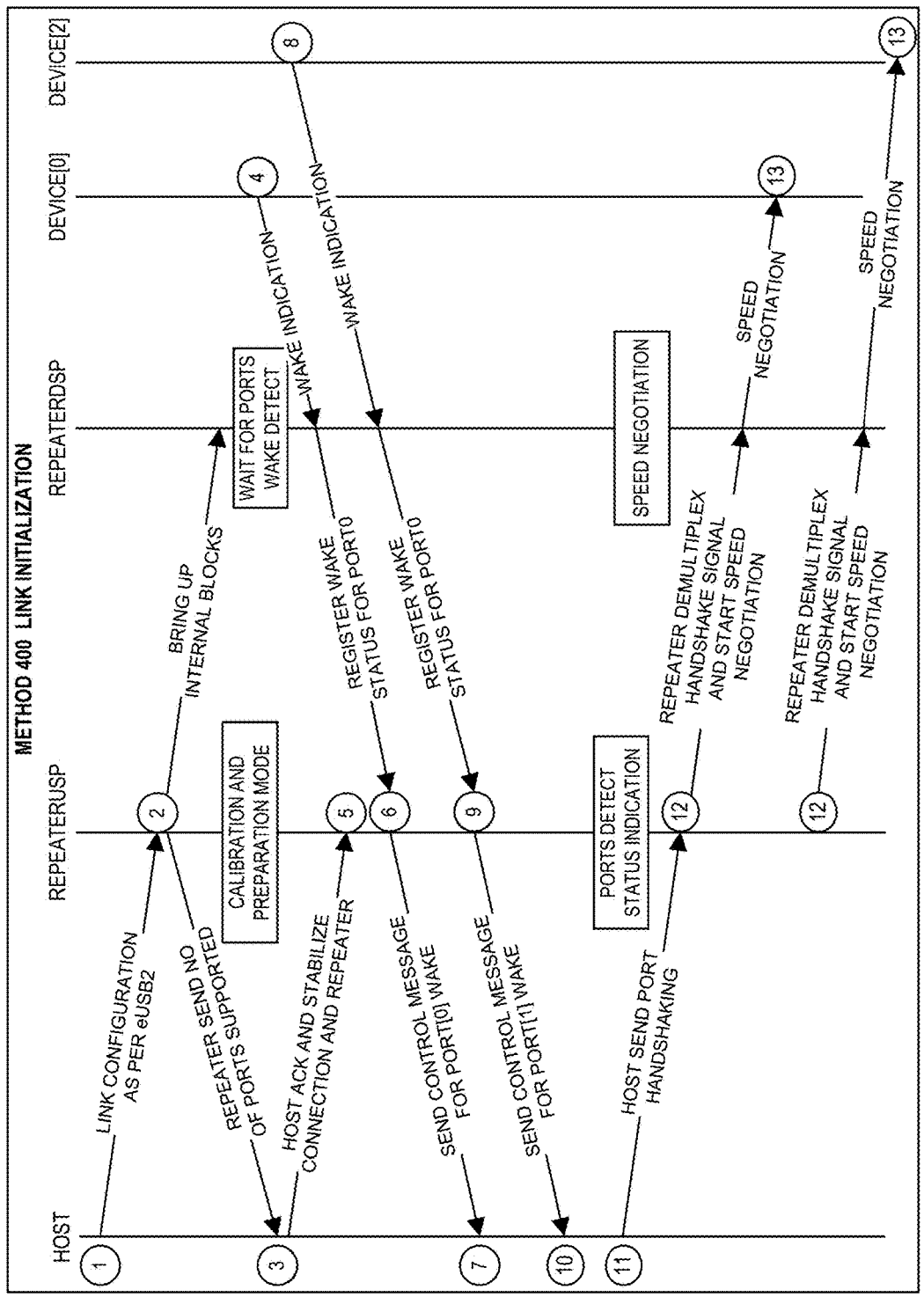
FIG. 4 is a flow diagram illustrating link initialization according to an embodiment of the invention.

FIG. 4 is a flow diagram of method 400 illustrating link initialization, in the hardware represented in FIGS. 1A, 2, and 3, according to an embodiment of the invention. In particular, FIG. 4 shows signal flow among a host (e.g., SoC 110), a repeater (e.g., repeater 130) upstream port (USP), a repeater (e.g., repeater 130) downstream port (DSP), and two devices connected to serial bus connectors (e.g., connectors 160). For example, an arrow from the vertical line representing the host to the vertical line representing the repeater USP represents signals from the host to the repeater USP.

Method 400 includes a handshake between the host and the repeater, including the repeater sending to the host information to indicate the number of serial bus connectors to be supported. Therefore, host lane controller 200 and repeater lane controller 300 may both be configured to multiplex/demultiplex between a single lane and a number of multiple lanes corresponding to the number of serial bus connectors.

Method 400 also includes sending of wake detection information from the repeater to the host.

Figure 5:
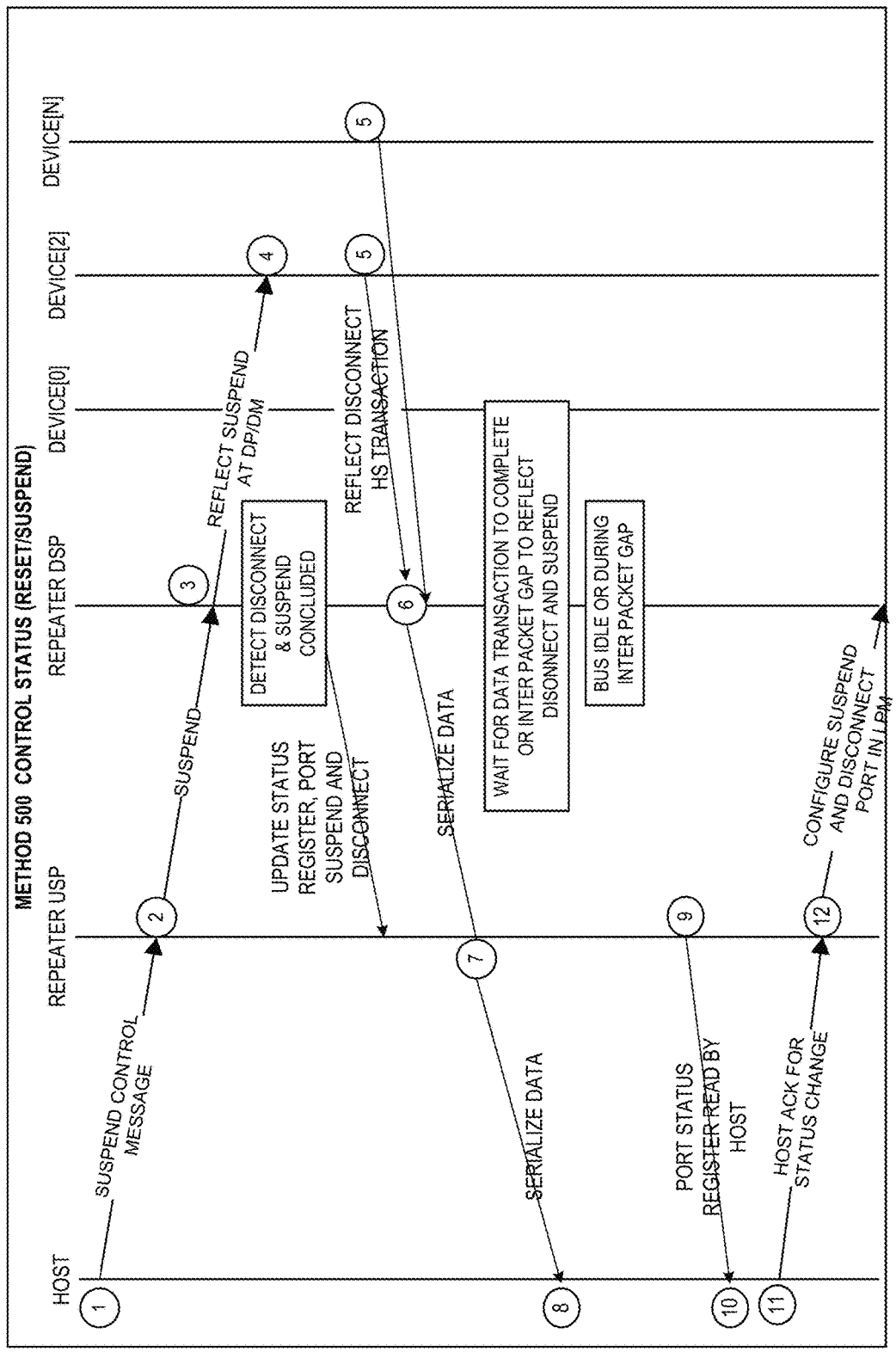
FIG. 5 is a flow diagram illustrating the operation of multiple serial bus ports according to an embodiment of the invention.
Figure 6A:
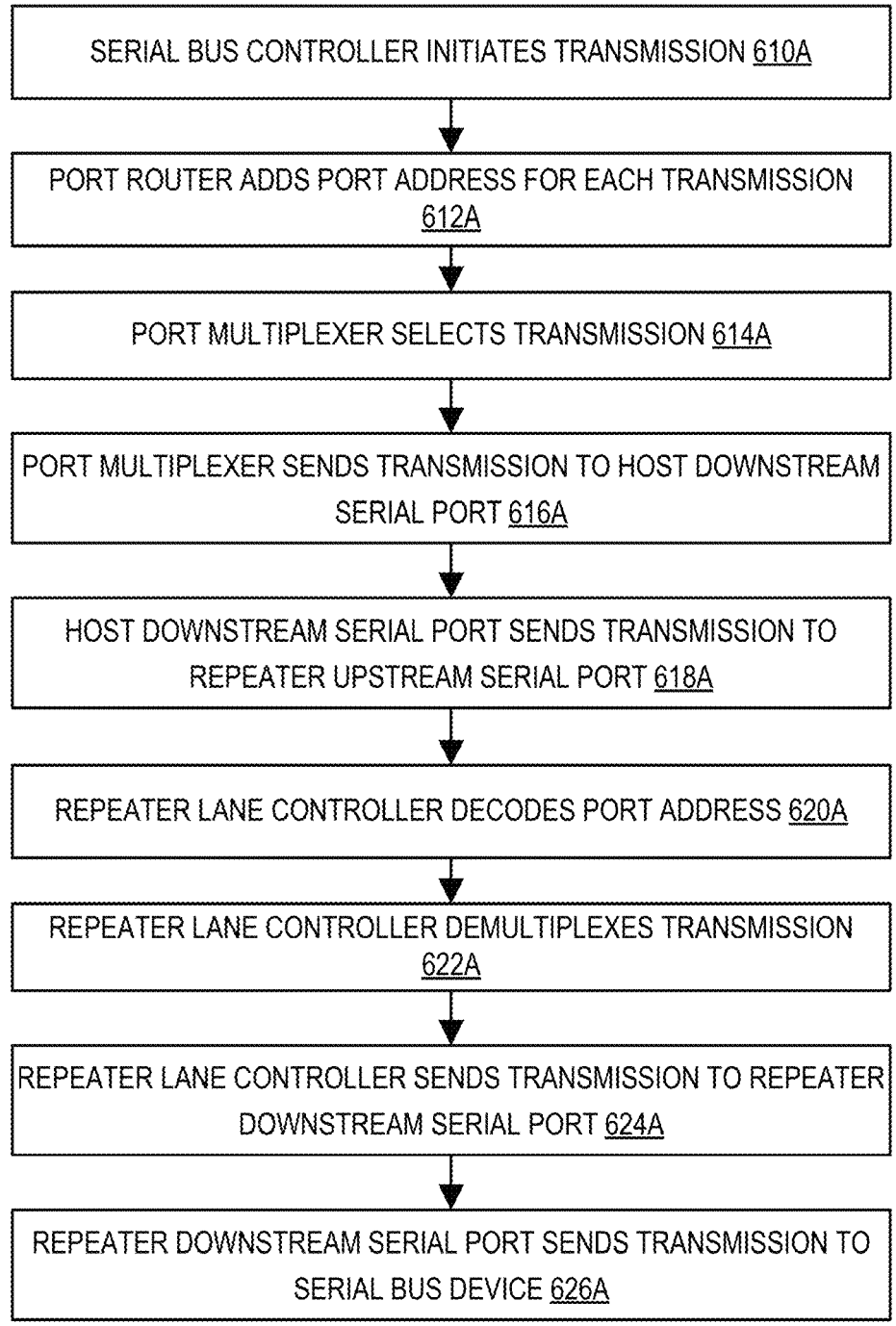
FIGS. 6A, 6B, 6C, and 6D are flow diagrams illustrating multilane serial bus communication according to embodiments of the invention.
Figure 6B:
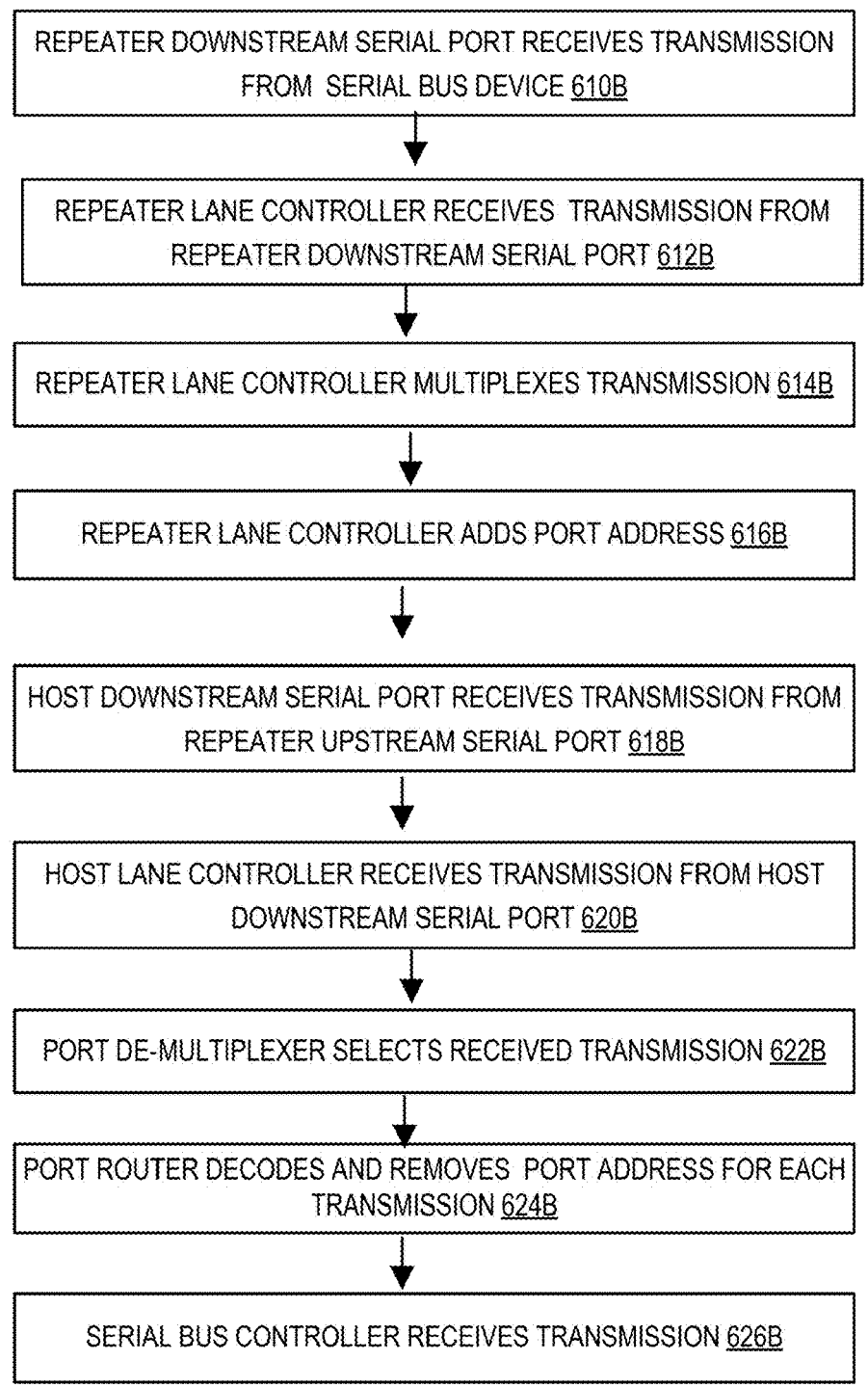
Figure 6C:
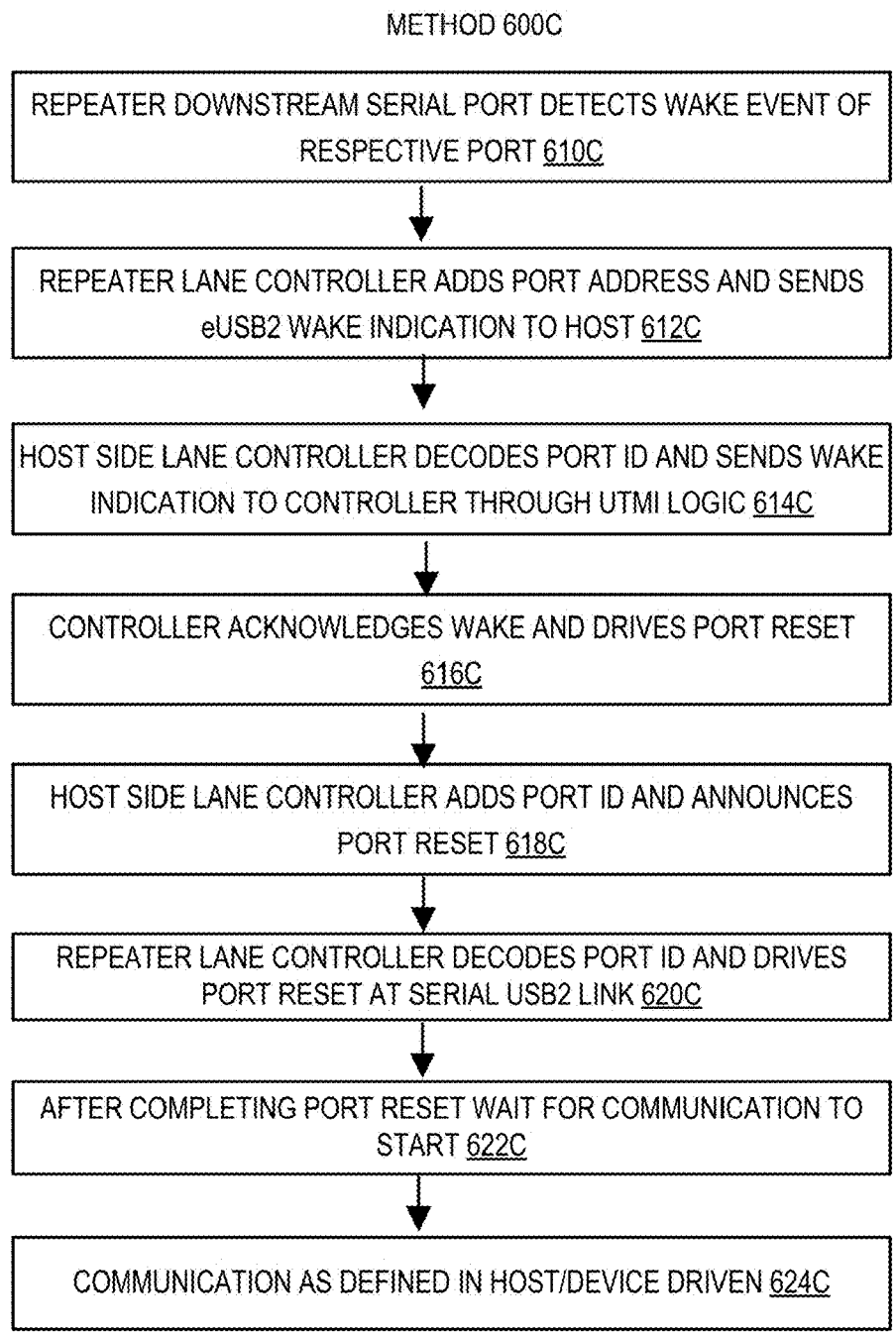
Figure 6D:
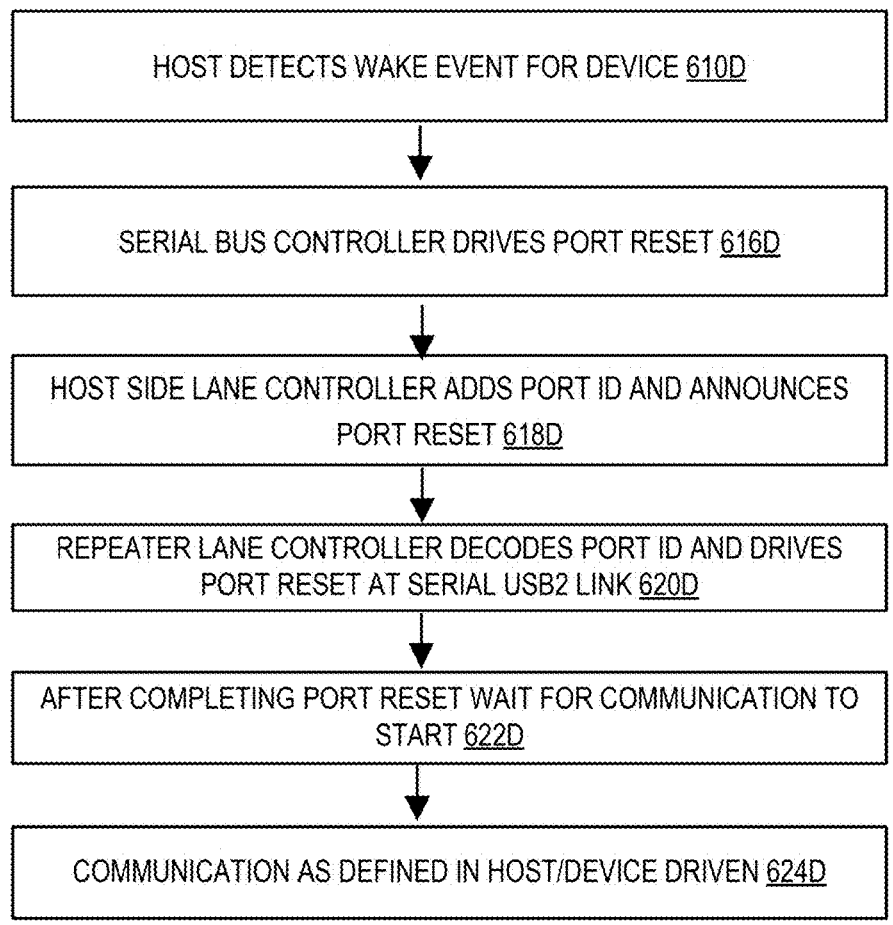

FIG. 5 is a flow diagram of method 500 illustrating the operation of multiple serial bus ports, in the hardware represented in FIGS. 1A, 2, and 3, according to an embodiment of the invention. In particular, FIG. 5 shows signal flow among a host (e.g., SoC 110), a repeater (e.g., repeater 130) upstream port (USP), a repeater (e.g., repeater 130) downstream port (DSP), and three devices connected to serial bus connectors (e.g., connectors 160). For example, an arrow from the vertical line representing the host to the vertical line representing the repeater USP represents signals from the host to the repeater USP.

Method 500 includes operation of a first device (device [0]) sending a data packet, a second device (device[2]) entering suspend, and a third device (device[N]) being disconnected. As such, method 500 illustrates the communication of control status (e.g., suspend, wake, reset) using the host and repeater lane controllers.

FIGS. 6A, 6B, 6C, and 6D are flow diagrams of method 600A, 600B, 600C, and 600D, respectively, of multilane serial bus communication, using the hardware represented in FIGS. 1A, 2, and 3, according to embodiments of the invention. Note that for convenience, each of these methods may described as referring to a single transmission; however, each block of each method and/or each method may be performed any number of times and/or may correspond to any number of transmissions. Method 600A illustrates a host send a data transmission to a device. Method 600B illustrates a device sending a data transmission to a host. Method 600C illustrates a wake event from the device side. Method 600D illustrates a wake event from the host side. Various other method embodiments of the present invention are possible.

In block 610A of method 600A, a data transmission to a serial bus device connected to a serial bus connector (e.g., 160A, 160B, . . . 160N) is initiated by serial bus controller 112. In block 612A, a port address corresponding to the serial bus connector is assigned to the data transmission by port router 210. In block 614A, the data transmission is selected from one of multiple lanes into port multiplexer 220. In block 616A, the data transmission is sent from the output of port multiplexer 220 to host downstream serial bus port 122. In block 618A, the data transmission is sent from host downstream serial bus port 122 to repeater upstream serial bus port 142.

In block 620A, the port address is decoded by repeater lane controller 140. In block 622A, the data transmission is demultiplexed by repeater lane controller 140 onto the lane corresponding to the port address determined from the decoding in block 620A (e.g., corresponding to one of serial bus connectors 160A, 160B, . . . 160N). In box 624A, the data transmission is sent, by repeater lane controller 140, to the repeater downstream serial bus port (e.g., serial bus port 144A, 144B, . . . 144N) corresponding to the serial bus connector. In box 626A, the data transmission is sent to the device connected to the serial bus connector.

In block 610B of method 600B, a data transmission from a serial bus device connected to a serial bus connector (e.g., 160A, 160B, . . . 160N) is received by a repeater downstream serial bus port (e.g., serial bus port 144A, 144B, . . . 144N). In block 612B, repeater lane controller 140 receives the data transmission from the repeater downstream serial port. In block 614B, the data transmission is selected by port multiplexer 320. In block 616B, the port address corresponding to the serial bus connector is assigned to the data transmission by port router 310. In block 618B, the data transmission is sent from repeater upstream serial bus port 142 to host downstream serial bus port 122.

In block 620B, host lane controller 120 receives the data transmission from host downstream serial port 122. In block 622B, the data transmission is demultiplexed by host lane controller 120 onto the lane corresponding to the serial bus connector. In box 624B, port router 210 decodes and removes the port address from the data transmission. In box 626B, serial bus controller 112 receives the data transmission.

In block 610C of method 600C, a repeater downstream serial port detects a wake event. In block 612C, the repeater lane controller adds the port address and sends an eUSB2 wake indication to the host. In block 614C, the host side lane controller decodes the port identifier and sends a wake indication to the serial bus controller through the UTMI logic. In block 616C, the serial bus controller acknowledges the wake and drives a port reset. In block 618C, the host side lane controller adds the port identifier and announces the port reset. In block 620C, the repeater lane controller decodes the port identifier and drives the port reset at the serial USB2 link. Block 622C represents waiting for communication to start following completion of the port reset. Block 624C represents the start of communication.

In block 610D of method 600D, the host detects a wake event for a device. In block 616D, the serial bus controller drives a port reset for the port corresponding to the device. In block 618D, the host side lane controller adds the port identifier and announces the port reset. In block 620D, the repeater lane controller decodes the port identifier and drives the port reset at the serial USB2 link. Block 622D represents waiting for communication to start following completion of the port reset. Block 624D represents the start of communication.

In an embodiment, an apparatus may include a serial bus controller, upstream serial bus lanes, a single downstream serial bus lane, and a host/device lane controller. The serial bus controller is to send and receive data transmissions to and from serial bus devices. The upstream serial bus lanes correspond to the serial bus devices and are associated with serial port addresses. The host/device lane controller is to receive data transmissions through the upstream serial bus lanes and includes a port address assignment circuit and a multiplexer. The port address assignment circuit is to assign serial port addresses to data transmissions, to be included in data transmissions to identify the upstream serial bus lanes through which the data transmission was received. The multiplexer is to forward data transmissions from upstream serial bus lanes to the single downstream serial bus. The host lane controller may include a register access protocol controller circuit to send and receive control status information over the plurality of upstream serial bus lanes and the single downstream serial bus lane. The host lane controller may include a demultiplexer to forward data transmissions from the single downstream serial bus lane to one of the plurality of upstream serial bus lanes. The host lane controller may decode a serial port address from a data transmission from the single downstream serial bus lane to determine to which of the plurality of upstream serial bus lanes to forward the data transmission. The apparatus may include a serial bus port coupled to the host lane controller to send data transmissions from the single downstream serial bus lane to a repeater. The repeater may demultiplex data transmissions from a single upstream serial bus lane to a plurality of downstream serial bus lanes. The repeater may decode a serial port address from a data transmission from the single upstream serial bus lane to determine to which of the plurality of downstream serial bus lanes to forward the data transmission. The serial bus port may communicate with the repeater using a first protocol, wherein the first protocol is an eUSB2 specification protocol. The repeater may convert data transmissions from the first protocol to a second, different protocol through which to communicate with the plurality of serial bus devices, wherein the second, different protocol is a USB specification protocol.

In an embodiment, a method may include sending, by a serial bus controller, a first data transmission to a host lane controller through a first of a plurality of upstream serial bus lanes, the first of the plurality of upstream serial bus lanes corresponding to a first of a plurality of serial bus devices and having an associated first of a plurality of serial port addresses; adding, by the host/device lane controller, the associated first of the plurality of serial port addresses to the first data transmission; and forwarding, by the host/device lane controller, the first data transmission from the first of the plurality of upstream serial bus lanes to a single downstream serial bus lane. The method may include sending, by the serial bus controller, a second data transmission to the host/device lane controller through a second of a plurality of upstream serial bus lanes, the second of the plurality of upstream serial bus lanes corresponding to a second of a plurality of serial bus devices and having an associated second of a plurality of serial port addresses; adding, by the host/device lane controller, the associated second of the plurality of serial port addresses to the second data transmission; and forwarding, by the host lane controller, the second data transmission from the second of the plurality of upstream serial bus lanes to the single downstream serial bus lane. The method may include sending and receiving, by a register access protocol controller circuit in the host lane controller, control status information over the plurality of upstream serial bus lanes and the single downstream serial bus lane. The method may include demultiplexing, by the host/device lane controller, a third data transmission from the single downstream serial bus lane to one of the plurality of upstream serial bus lanes. The method may include decoding, by the host/device lane controller, a serial port address from the third data transmission from the single downstream serial bus lane to determine to which of the plurality of upstream serial bus lanes to forward the third data transmission. The method may include sending, by a serial bus port coupled to the host/device lane controller, the first data transmissions from the single downstream serial bus lane to a repeater. The method may include demultiplexing, by the repeater, the third data transmissions from a single upstream serial bus lane to one of a plurality of downstream serial bus lanes. The method may include decoding, by the host/device repeater, a serial port address from the first data transmission from the single upstream serial bus lane to determine to which of the plurality of downstream serial bus lanes to forward the first data transmission. The method may include sending, by the repeater, the first data transmission from the one of the plurality of downstream serial bus lanes to the first of the plurality of serial bus devices. The serial bus port may communicate with the host/device repeater using a first protocol, wherein the first protocol is an embedded Universal Serial Bus specification protocol or high speed signaling. The repeater may convert data transmissions from the first protocol to a second, different protocol through which to communicate with the plurality of serial bus devices, wherein the second, different protocol is a Universal Serial Bus specification protocol.

In an embodiment, a system may include a plurality of serial bus device connectors in which to connect a plurality of serial bus devices; a system-on-a-chip including: a serial bus controller to send and receive data transmissions to and from the plurality of serial bus devices; a plurality of upstream serial bus lanes, at least one of the plurality of upstream serial bus lanes corresponding to one of the plurality of serial bus devices and being associated with one of a plurality of serial port addresses; a single downstream serial bus lane; and a host/device lane controller coupled to the serial bus controller to receive data transmissions through the plurality of upstream serial bus lanes, the host/device lane controller including a port address assignment circuit and a multiplexer, the port address assignment circuit to assign one of the plurality of serial port addresses to at least one data transmission, the one of the plurality of serial port addresses to be included in the at least one data transmission to identify one of the plurality of upstream serial bus lanes through which the data transmission was received, the multiplexer to forward data transmissions from the plurality of upstream serial bus lanes to a single downstream serial bus lane; and a host/device repeater coupled to the system-on-a-chip (host/device), including: a single upstream serial bus lane to receive data transmissions from the single downstream serial bus lane; a plurality of downstream serial bus lanes; and a host/device repeater lane controller including a demultiplexer to demultiplex data transmission from the single upstream serial bus lane to the plurality of downstream serial bus lanes. The host/device lane controller may include a first register access protocol controller circuit to send and receive control status information over the plurality of upstream serial bus lanes and the single downstream serial bus lane; and the host/device repeater lane controller may include a second register access protocol controller circuit to send and receive control status information over the single upstream serial bus lane and the plurality of downstream serial bus lanes. The repeater may decode the serial port address from the data transmission from the single upstream serial bus lane to determine to which of the plurality of downstream serial bus lanes to forward the data transmission. The SoC may include a serial bus port to communicate with the repeater using a first protocol, wherein the first protocol is an eUSB specification protocol or high speed signaling. The repeater may convert data transmissions from the first protocol to a second, different protocol through which to communicate with the plurality of serial bus devices, wherein the second, different protocol is a USB specification protocol.

In an embodiment, an apparatus may include a serial bus controller, upstream serial bus lanes, a single downstream serial bus lane, and a host/device lane controller. The serial bus controller may include means for sending and receiving data transmissions to and from serial bus devices. The upstream serial bus lanes correspond to the serial bus devices and are associated with serial port addresses. The host lane controller may include means for receiving data transmissions through the upstream serial bus lanes; means for assigning serial port addresses to data transmissions, to be included in data transmissions to identify the upstream serial bus lanes through which the data transmission was received; and means for forwarding data transmissions from upstream serial bus lanes to the single downstream serial bus.

In an embodiment, an apparatus may comprise a data storage device that stores code that when executed by a hardware processor causes the hardware processor to perform any method disclosed herein. An apparatus may be as described in the detailed description. A method may be as described in the detailed description.

In an embodiment, a non-transitory machine readable medium may store code that when executed by a machine causes the machine to perform a method comprising any method disclosed herein.

Circuitry (e.g., a hub, host, and/or device) may include a transmitter and/or a receiver to send and receive data, respectively, e.g., as part of a transceiver (e.g., a physical layer (PHY) circuit). Circuitry may connect via a (e.g., USB) cable, which may include a plug received by a receptacle.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality of Service (QoS), Hot-Plug/Hot-Swap support, Data Integrity, and Error Handling are among some of the advanced features supported by PCI Express.

Figure 7:
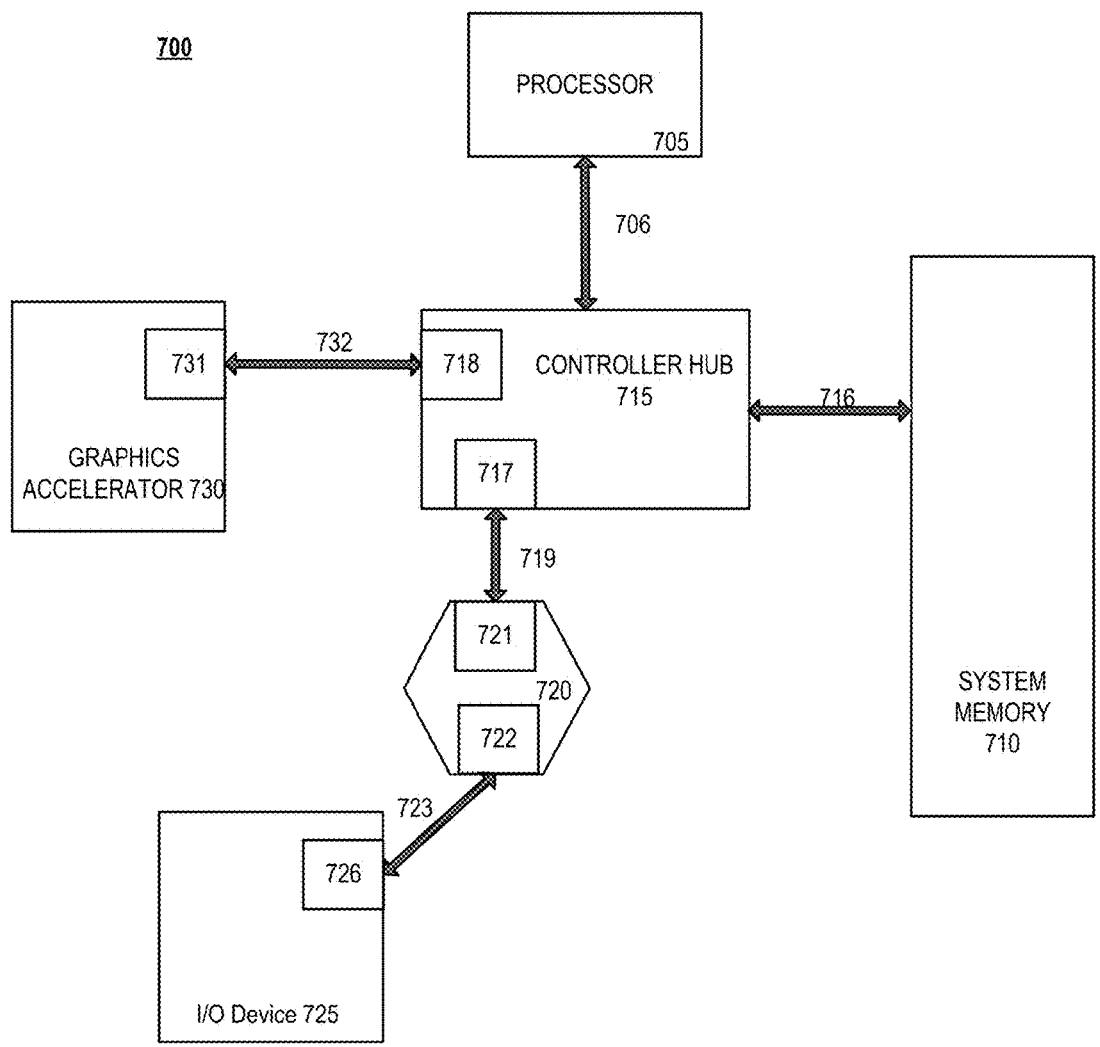
FIG. 7 illustrates a computing system including a peripheral component interconnect express (PCIe) compliant architecture according to embodiments of the disclosure.

Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, e.g., up a hierarchy towards a root complex, to controller hub 715 and downstream, e.g., down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly to I/O device 725 through serial link 723, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
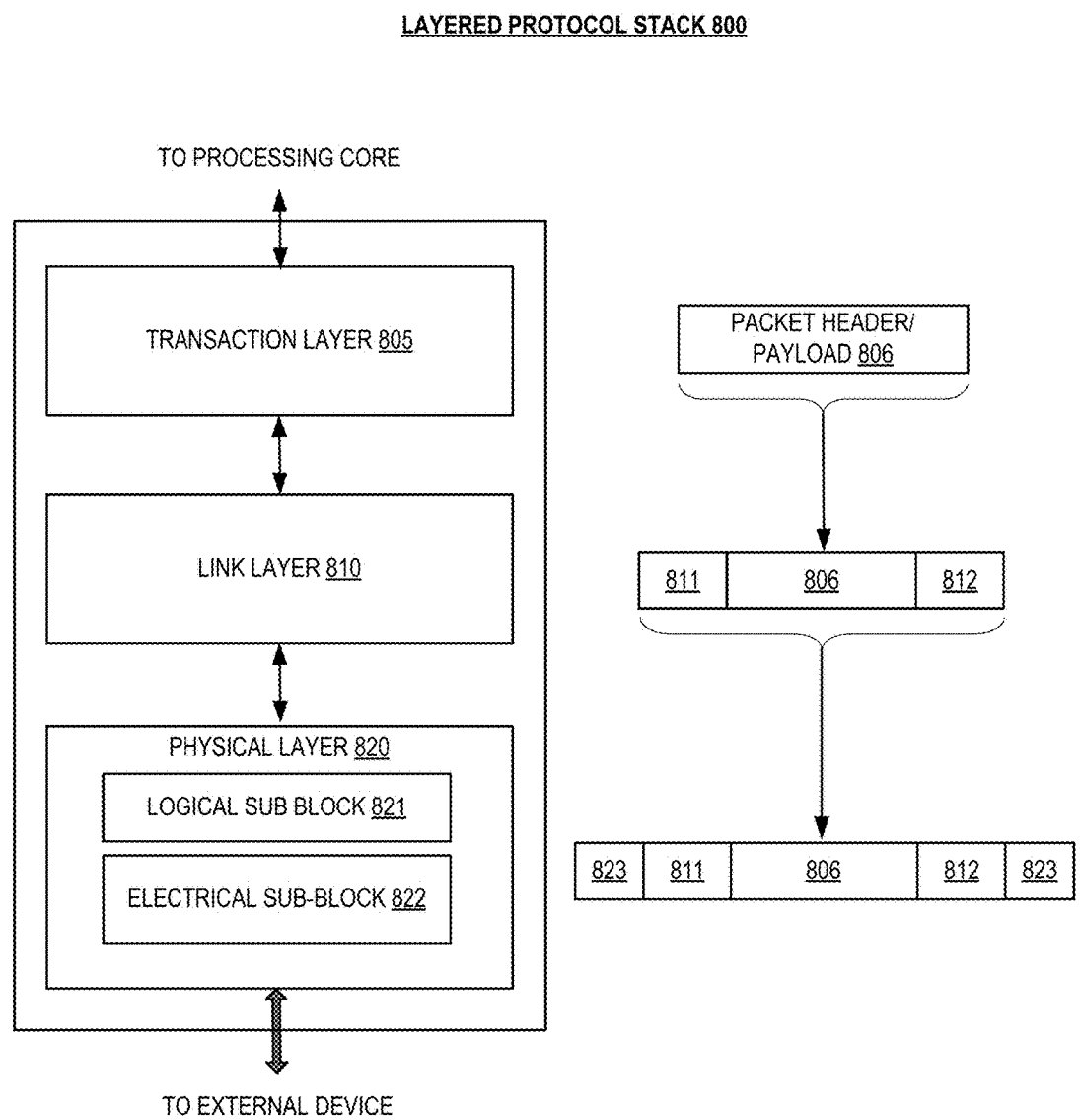
FIG. 8 illustrates a PCIe compliant interconnect architecture including a layered stack according to embodiments of the disclosure.

Turning to FIG. 8 an embodiment of a layered protocol stack is illustrated. Layered protocol stack 800 includes any form of a layered communication stack, such as a Quick Path Interconnect (QPI) stack, a PCIe stack, a next generation high performance computing interconnect stack, or other layered stack. Although the discussion immediately below in reference to FIGS. 7-8 are in relation to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 7, may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 805 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (e.g., transaction layer packets, or TLPs). The translation layer 805 typically manages credit-base flow control for TLPs. PCIe implements split transactions, e.g., transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 805. An external device at the opposite end of the link, such as a controller hub 715 in FIG. 7, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Figure 9:
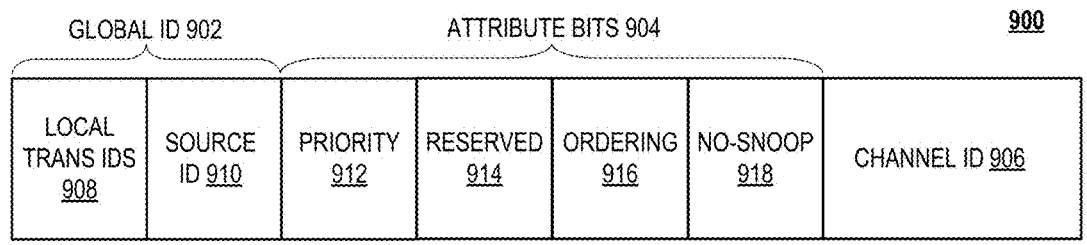
FIG. 9 illustrates a PCIe compliant request or packet to be generated or received within an interconnect architecture according to embodiments of the disclosure.

Referring to FIG. 9, an embodiment of a PCIe transaction descriptor is illustrated. In one embodiment, transaction descriptor 900 is a mechanism for carrying transaction information. In this regard, transaction descriptor 900 supports identification of transactions in a system. Other potential uses include tracking modifications of default transaction ordering and association of transaction with channels.

Transaction descriptor 900 includes global identifier field 902, attributes field 904 and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 910 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 99, ordering field 916, and no-snoop field 918. Here, priority sub-field 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 1416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1418 is utilized to determine if transactions are snooped. As shown, channel ID Field 906 identifies a channel that a transaction is associated with.

Link Layer

Link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, e.g., an identification number or packet number, calculates and applies an error detection code, e.g., CRC 812, and submits the modified TLPs to the Physical Layer 820 for transmission across a physical to an external device.

Physical Layer

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8 b/10 b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g., a link layer; and a third layer to transmit the packets, e.g., a physical layer. As a specific example, a common standard interface (CSI) layered protocol is utilized.

Figure 10:
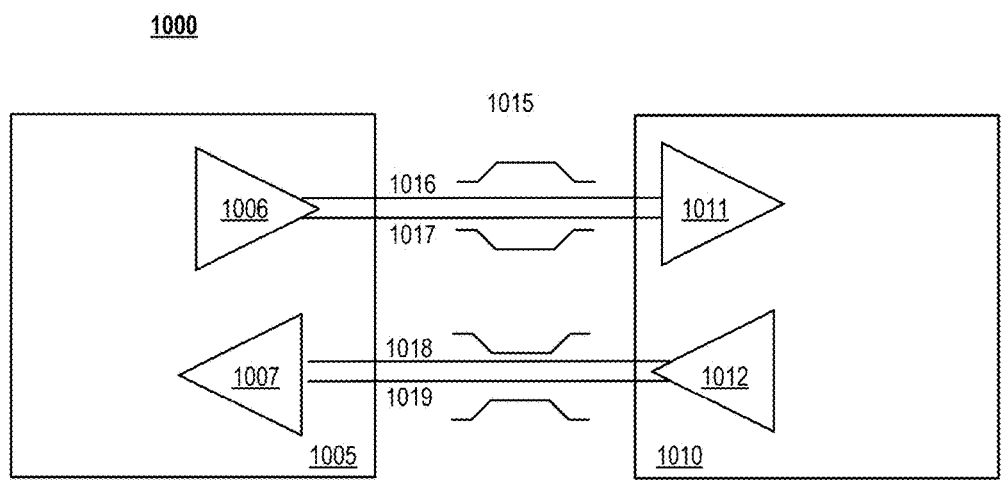
FIG. 10 illustrates a transmitter and receiver pair for a PCIe compliant interconnect architecture according to embodiments of the disclosure.

Referring next to FIG. 10, an embodiment of a PCIe serial point to point fabric 1000 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, e.g., paths 1016 and 1017, and two receiving paths, e.g., paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 1015. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1016 and 1017, to transmit differential signals. As an example, when line 1016 toggles from a low voltage level to a high voltage level, e.g., a rising edge, line 1017 drives from a high logic level to a low logic level, e.g., a falling edge. Differential signals potentially demonstrate better electrical characteristics, such as better signal integrity, e.g., cross-coupling, voltage overshoot/undershoot, ringing, etc. This allows for better timing window, which enables faster transmission frequencies.

Figure 11:
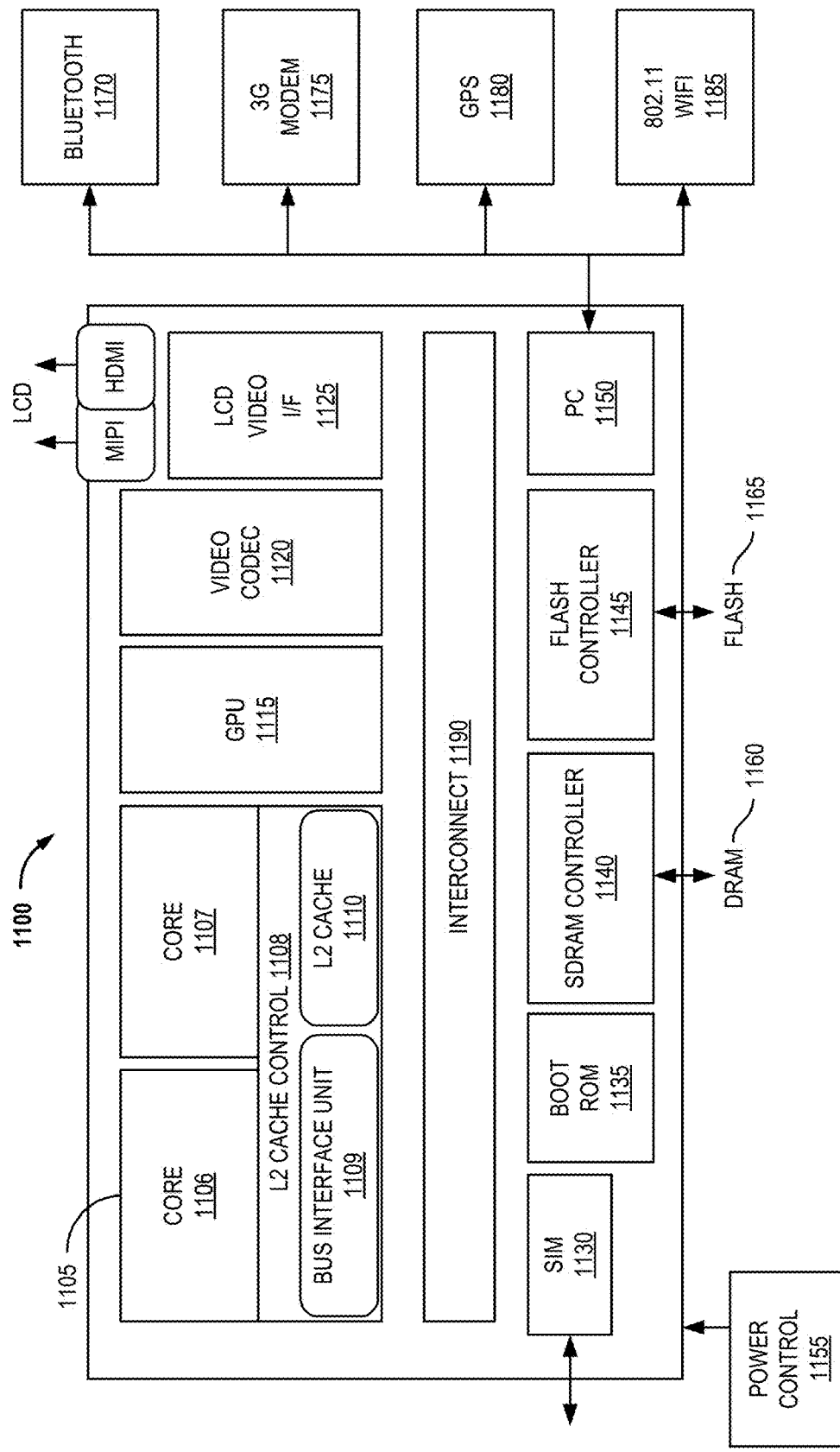
FIG. 11 illustrates a computing system on a chip according to embodiments of the disclosure.

Turning next to FIG. 11, an embodiment of a system on-chip (SOC) design in accordance with the embodiments is depicted. As a specific illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Similar to the discussion above, cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1190 includes an on-chip interconnect, such as an IOSF, AMBA, or other interconnect discussed above, which potentially implements one or more aspects of the described embodiments.

Interconnect 1190 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g.

touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and WiFi 1185. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the figures below provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 12:
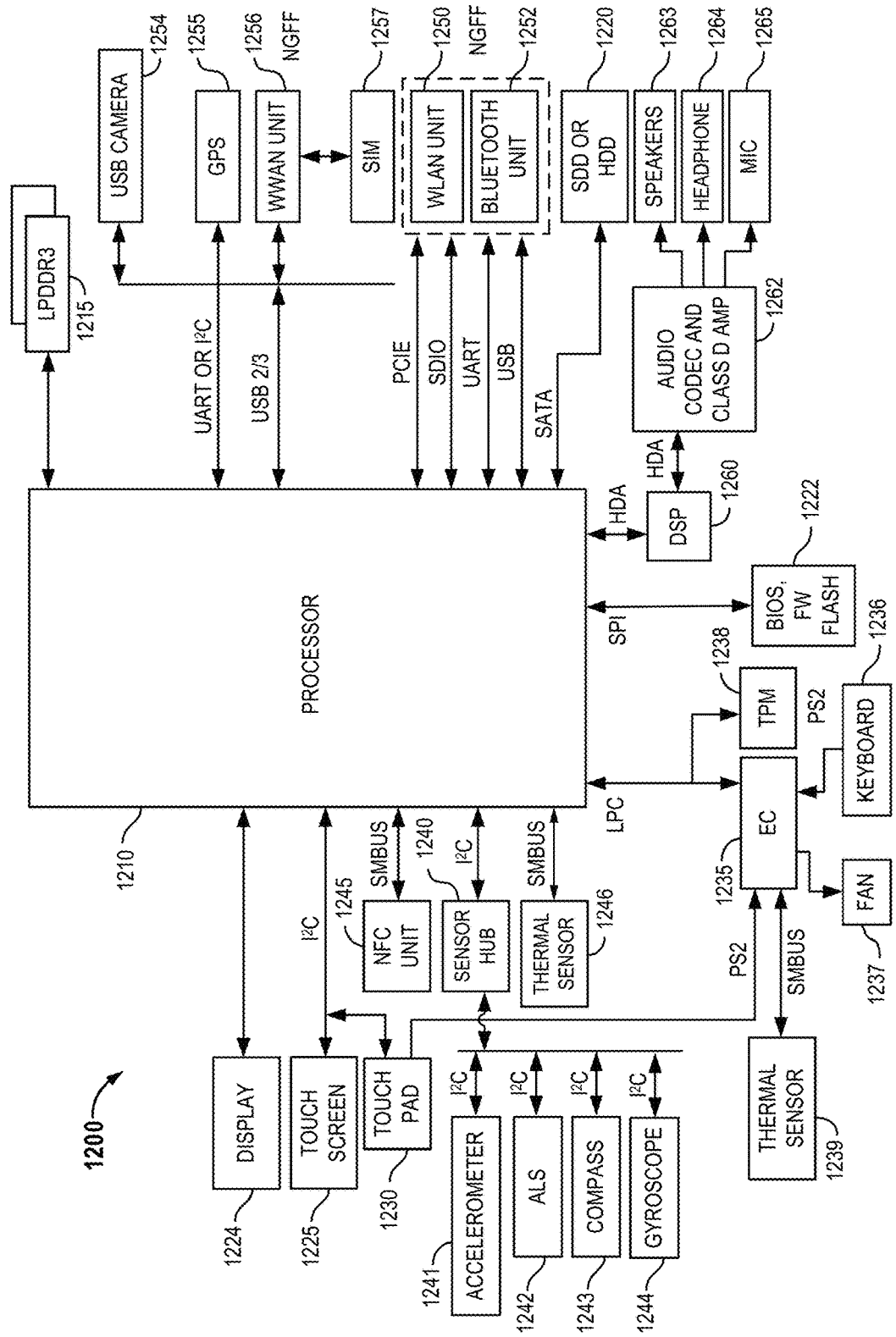
FIG. 12 illustrates an embodiment of a block diagram for a computing system.

Referring now to FIG. 12, a block diagram of components present in a computer system in accordance with embodiments of the disclosure is illustrated. As shown in FIG. 12, system 1200 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 12 is intended to show a high-level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 12, a processor 1210, in one embodiment, includes a microprocessor, multi-core processor, multi-threaded processor, an ultra-low voltage processor, an embedded processor, or another known processing element. In the illustrated implementation, processor 1210 acts as a main processing unit and central hub for communication with many of the various components of the system 1200. As one example, processor 1210 is implemented as a system on a chip (SoC). As a specific illustrative example, processor 1210 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1210 in one implementation will be discussed further below to provide an illustrative example.

Processor 1210, in one embodiment, communicates with a system memory 1215. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1220 may also couple to processor 1210. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 12, a flash device 1222 may be coupled to processor 1210, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1200. Specifically shown in the embodiment of FIG. 12 is a display 1224 which may be a high definition LCD or LED panel configured within a lid portion of the chassis. This display panel may also provide for a touch screen 1225, e.g., adapted externally over the display panel such that via a user's interaction with this touch screen, user inputs can be provided to the system to enable desired operations, e.g., with regard to the display of information, accessing of information and so forth. In one embodiment, display 1224 may be coupled to processor 1210 via a display interconnect that can be implemented as a high performance graphics interconnect. Touch screen 1225 may be coupled to processor 1210 via another interconnect, which in an embodiment can be an I²C interconnect. As further shown in FIG. 12, in addition to touch screen 1225, user input by way of touch can also occur via a touch pad 1230 which may be configured within the chassis and may also be coupled to the same I²C interconnect as touch screen 1225.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1210 in different manners. Certain inertial and environmental sensors may couple to processor 1210 through a sensor hub 1240, e.g., via an I²C interconnect. In the embodiment shown in FIG. 12, these sensors may include an accelerometer 1241, an ambient light sensor (ALS) 1242, a compass 1243 and a gyroscope 1244. Other environmental sensors may include one or more thermal sensors 1246 which in some embodiments couple to processor 1210 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 12, various peripheral devices may couple to processor 1210 via a low pin count (LPC) interconnect. In the embodiment shown, various components can be coupled through an embedded controller (EC) 1235. Such components can include a keyboard 1236 (e.g., coupled via a PS2 interface), a fan 1237, and a thermal sensor 1239. In some embodiments, touch pad 1230 may also couple to EC 1235 via a PS2 interface. In addition, a security processor such as a trusted platform module (TPM) 1238 in accordance with the Trusted Computing Group (TCG) TPM Specification Version 1.2 , dated Oct. 2, 2003 , may also couple to processor 1210 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1200 can communicate with external devices in a variety of manners, including wirelessly. In the embodiment shown in FIG. 12, various wireless modules, each of which can correspond to a radio configured for a particular wireless communication protocol, are present. One manner for wireless communication in a short range such as a near field may be via a near field communication (NFC) unit 1245 which may communicate, in one embodiment with processor 1210 via an SMBus. Note that via this NFC unit 1245, devices in close proximity to each other can communicate. For example, a user can enable system 1200 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 12, additional wireless units can include other short range wireless engines including a WLAN unit 1250 and a Bluetooth unit 1252. Using WLAN unit 1250, Wi-Fi™ communications in accordance with a given Institute of Electrical and Electronics Engineers (IEEE) 802.11 standard can be realized, while via Bluetooth unit 1252, short range communications via a Bluetooth protocol can occur. These units may communicate with processor 1210 via, e.g., a USB link or a universal asynchronous receiver transmitter (UART) link. Or these units may couple to processor 1210 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1256 which in turn may couple to a subscriber identity module (SIM) 1257. In addition, to enable receipt and use of location information, a GPS module 1255 may also be present. Note that in the embodiment shown in FIG. 12, WWAN unit 1256 and an integrated capture device such as a camera module 1254 may communicate via a given USB protocol, e.g., USB 2.0 or 3.0 link, or a UART or $I^2C$ protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1260, which may couple to processor 1210 via a high definition audio (HDA) link. Similarly, DSP 1260 may communicate with an integrated coder/decoder (CODEC) and amplifier 1262 that in turn may couple to output speakers 1263 which may be implemented within the chassis. Similarly, amplifier and CODEC 1262 can be coupled to receive audio inputs from a microphone 1265 which in an embodiment can be implemented via dual array microphones (such as a digital microphone array) to provide for high quality audio inputs to enable voice-activated control of various operations within the system. Note also that audio outputs can be provided from amplifier/CODEC 1262 to a headphone jack 1264. Although shown with these particular components in the embodiment of FIG. 12, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1210 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1235. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 735 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 7, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 13:
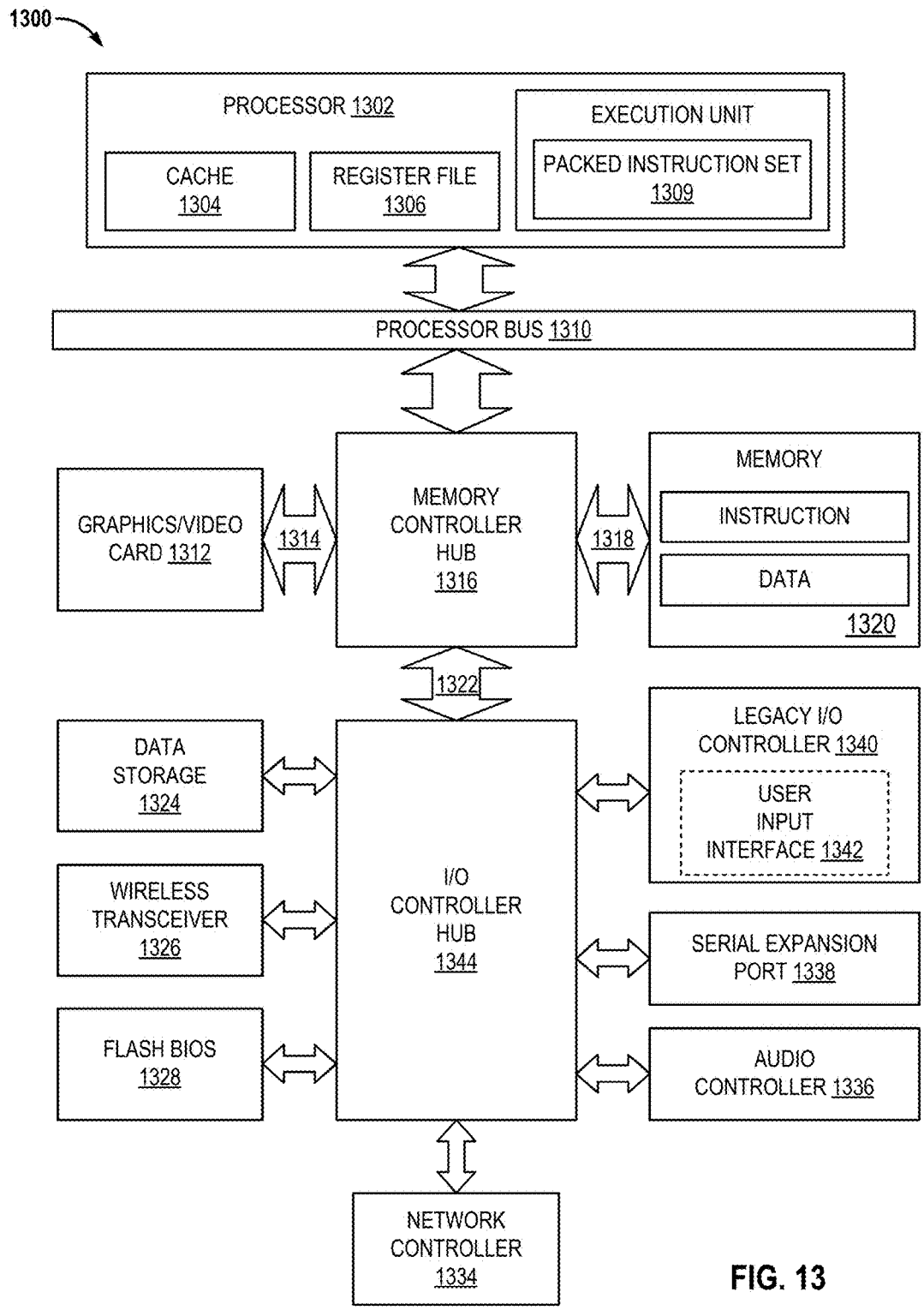
FIG. 13 illustrates another embodiment of a block diagram for a computing system.

Turning to FIG. 13, a block diagram of an exemplary computer system formed with a processor that includes execution units to execute an instruction, where one or more of the interconnects implement one or more features in accordance with embodiments of the disclosure is illustrated. System 1300 includes a component, such as a processor 1302 to employ execution units including logic to perform algorithms for process data, in accordance with the present disclosure, such as in the embodiment described herein. System 1300 is representative of processing systems based on the PENTIUM III™, PENTIUM 4™, Xeon™, Itanium, XScale™ and/or StrongARM™microprocessors available from Intel Corporation of Santa Clara, Calif., although other systems (including PCs having other microprocessors, engineering workstations, set-top boxes and the like) may also be used. In one embodiment, sample system 1300 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1302 includes one or more execution units 1308 to implement an algorithm that is to perform at least one instruction. One embodiment may be described in the context of a single processor desktop or server system, but alternative embodiments may be included in a multiprocessor system. System 1300 is an example of a 'hub' system architecture. The computer system 1300 includes a processor 1302 to process data signals. The processor 1302, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1302 is coupled to a processor bus 1310 that transmits data signals between the processor 1302 and other components in the system 1300. The elements of system 1300 (e.g. graphics accelerator 1312, memory controller hub 2016, memory 1320, I/O controller hub 1344, wireless transceiver 1326, Flash BIOS 1328, Network controller 1334, Audio controller 1336, Serial expansion port 1338, I/O controller 1340, etc.) perform their conventional functions that are well known to those familiar with the art.

In one embodiment, the processor 1302 includes a Level 1 (L1) internal cache memory 1304. Depending on the architecture, the processor 1302 may have a single internal cache or multiple levels of internal caches. Other embodiments include a combination of both internal and external caches depending on the particular implementation and needs. Register file 1306 is to store different types of data in various registers including integer registers, floating point registers, vector registers, banked registers, shadow registers, checkpoint registers, status registers, and instruction pointer register.

Execution unit 1308, including logic to perform integer and floating point operations, also resides in the processor 1302. The processor 1302, in one embodiment, includes a microcode (μcode) ROM to store microcode, which when executed, is to perform algorithms for certain macroinstructions or handle complex scenarios. Here, microcode is potentially updateable to handle logic bugs/fixes for processor 1302. For one embodiment, execution unit 1308 includes logic to handle a packed instruction set 1309. By including the packed instruction set 1309 in the instruction set of a general-purpose processor 1302, along with associated circuitry to execute the instructions, the operations used by many multimedia applications may be performed using packed data in a general-purpose processor 1302. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1308 may also be used in micro controllers, embedded processors, graphics devices, DSPs, and other types of logic circuits. System 1300 includes a memory 1320. Memory 1320 includes a dynamic random access memory (DRAM) device, a static random access memory (SRAM) device, flash memory device, or other memory device. Memory 1320 stores instructions and/or data represented by data signals that are to be executed by the processor 1302.

Note that any of the aforementioned features or aspects of the embodiments of the disclosure may be utilized on one or more interconnect illustrated in FIG. 13. For example, an on-die interconnect (ODI), which is not shown, for coupling internal units of processor 1302 implements one or more aspects of the disclosure herein. Or the embodiments of the disclosure are associated with a processor bus 1310 (e.g. Intel Quick Path Interconnect (QPI) or other known high performance computing interconnect), a high bandwidth memory path 1318 to memory 1320, a point-to-point link 1314 to graphics accelerator 1312 (e.g. a Peripheral Component Interconnect express (PCIe) compliant fabric), a controller hub interconnect 1322, an I/O or other interconnect (e.g. USB, PCI, PCIe) for coupling the other illustrated components. Some examples of such components include the audio controller 1336, firmware hub (flash BIOS) 1328, wireless transceiver 1326, data storage 1324, legacy I/O controller 1310 containing user input and keyboard interfaces 1342, a serial expansion port 1338 such as Universal Serial Bus (USB), and a network controller 1334. The data storage device 1324 can comprise a hard disk drive, a floppy disk drive, a CD-ROM device, a flash memory device, or other mass storage device.

Figure 14:
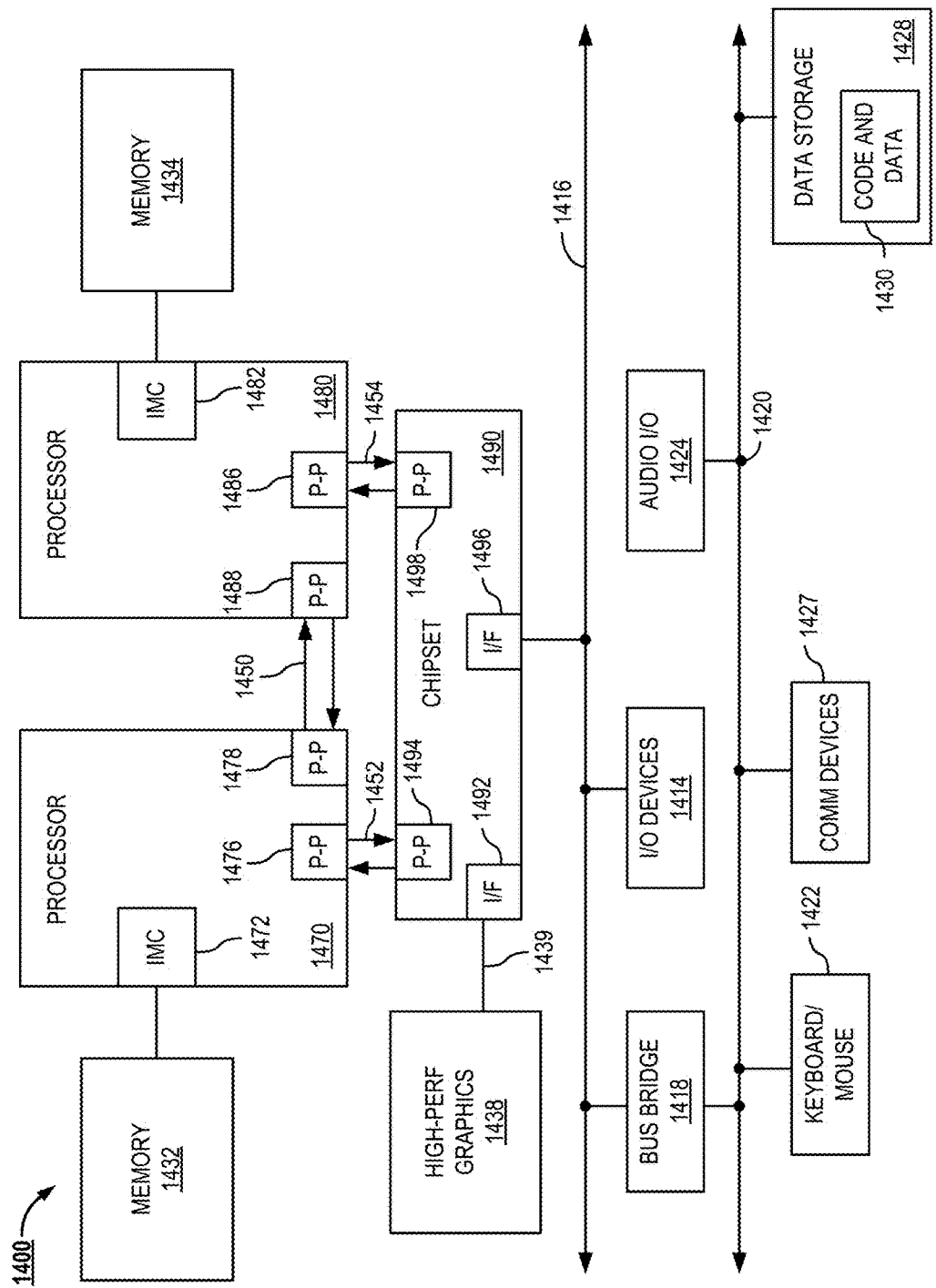
FIG. 14 illustrates another embodiment of a block diagram for a computing system.

Referring now to FIG. 14, shown is a block diagram of a second system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as Intel's Quick Path Interconnect (QPI) architecture. As a result, embodiments of the disclosure may be implemented within the QPI architecture.

While shown with only two processors 1470, 1480, it is to be understood that the scope of the present disclosure is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

What is claimed is:

1. An apparatus comprising:
   a serial bus controller to send and receive data transmissions to and from a plurality of serial bus devices;
   a plurality of upstream serial bus lanes, at least one of the plurality of upstream high speed serial bus lanes corresponding to one of the plurality of serial bus devices and being associated with one of a plurality of serial port addresses;
   a single downstream serial bus lane; and
   a host/device lane controller coupled to the serial bus controller to receive data transmissions through the plurality of upstream high speed serial bus lanes, the host/device lane controller including a port address assignment circuit and a multiplexer, the port address assignment circuit to assign one of the plurality of serial port addresses to at least one data transmission, the one of the plurality of serial port addresses to be included in the at least one data transmission to identify one of the plurality of upstream serial bus lanes through which the data transmission was received, the multiplexer to forward data transmissions from the plurality of upstream serial bus lanes to the single downstream serial bus lane.

2. The apparatus of claim 1, wherein the host/device lane controller also includes a register access protocol controller circuit to send and receive control status information over the plurality of upstream serial bus lanes and the single downstream serial bus lane.

3. The apparatus of claim 1, wherein the host/device lane controller also includes a demultiplexer to forward data transmissions from the single downstream serial bus lane to one of the plurality of upstream serial bus lanes.

4. The apparatus of claim 3, wherein the host/device lane controller is also to decode a serial port address from a data transmission from the single downstream serial bus lane to determine to which of the plurality of upstream serial bus lanes to forward the data transmission.

5. The apparatus of claim 1, further comprising a serial bus port coupled to the host/device lane controller to send data transmissions from the single downstream serial bus lane to a host/device repeater.

6. The apparatus of claim 5, wherein the host/device repeater is to demultiplex data transmissions from a single upstream serial bus lane to a plurality of downstream serial bus lanes.

7. The apparatus of claim 6, wherein the host/device repeater is also to decode a serial port address from a data transmission from the single upstream serial bus lane to determine to which of the plurality of downstream serial bus lanes to forward the data transmission.

8. The apparatus of claim 5, wherein the serial bus port is to communicate with the host/device repeater using a first protocol, wherein the first protocol is an embedded Universal Serial Bus specification protocol or high speed signaling.

9. The apparatus of claim 8, wherein the host/device repeater is to convert data transmissions from the first protocol to a second, different protocol through which to communicate with the plurality of serial bus devices, wherein the second, different protocol is a Universal Serial Bus specification protocol.

10. A method comprising:
sending, by a serial bus controller, a first data transmission to a host/device lane controller through a first of a plurality of upstream serial bus lanes, the first of the plurality of upstream serial bus lanes corresponding to a first of a plurality of serial bus devices and having an associated first of a plurality of serial port addresses;
adding, by the host/device lane controller, the associated first of the plurality of serial port addresses to the first data transmission; and
forwarding, by the host/device lane controller, the first data transmission from the first of the plurality of upstream serial bus lanes to a single downstream serial bus lane.

11. The method of claim 10, further comprising:
sending, by the serial bus controller, a second data transmission to the host/device lane controller through a second of a plurality of upstream serial bus lanes, the second of the plurality of upstream serial bus lanes corresponding to a second of a plurality of serial bus devices and having an associated second of a plurality of serial port addresses;
adding, by the host/device lane controller, the associated second of the plurality of serial port addresses to the second data transmission; and
forwarding, by the host/device lane controller, the second data transmission from the second of the plurality of upstream serial bus lanes to the single downstream serial bus lane.

12. The method of claim 10, further comprising sending and receiving, by a register access protocol controller circuit in the host/device lane controller, control status information over the plurality of upstream serial bus lanes and the single downstream serial bus lane.

13. The method of claim 10, further comprising demultiplexing, by the host/device lane controller, a third data transmission from the single downstream serial bus lane to one of the plurality of upstream serial bus lanes.

14. The method of claim 13, further comprising decoding, by the host/device lane controller, a serial port address from the third data transmission from the single downstream serial bus lane to determine to which of the plurality of upstream serial bus lanes to forward the third data transmission.

15. The method of claim 10, further comprising sending, by a serial bus port coupled to the host/device lane controller, the first data transmissions from the single downstream serial bus lane to a host/device repeater.

16. The method of claim 15, further comprising demultiplexing, by the host/device repeater, the third data transmissions from a single upstream serial bus lane to one of a plurality of downstream serial bus lanes.

17. The method of claim 16, further comprising decoding, by the host/device repeater, a serial port address from the first data transmission from the single upstream serial bus lane to determine to which of the plurality of downstream serial bus lanes to forward the first data transmission.

18. The method of claim 17, further comprising sending, by the host/device repeater, the first data transmission from the one of the plurality of downstream serial bus lanes to the first of the plurality of serial bus devices.

19. The method of claim 18, wherein the serial bus port is to communicate with the host/device repeater using a first protocol, wherein the first protocol is an embedded Universal Serial Bus specification protocol.

20. The method of claim 19, wherein the host/device repeater is to convert data transmissions from the first protocol to a second, different protocol through which to communicate with the plurality of serial bus devices, wherein the second, different protocol is a Universal Serial Bus specification protocol.

21. A system comprising:
a plurality of serial bus device connectors in which to connect a plurality of serial bus devices;
a host/device system-on-a-chip including:
a serial bus controller to send and receive data transmissions to and from the plurality of serial bus devices;
a plurality of upstream serial bus lanes, at least one of the plurality of upstream serial bus lanes corresponding to one of the plurality of serial bus devices and being associated with one of a plurality of serial port addresses;
a single downstream serial bus lane; and
a host/device lane controller coupled to the serial bus controller to receive data transmissions through the plurality of upstream serial bus lanes, the host/device lane controller including a port address assignment circuit and a multiplexer, the port address assignment circuit to assign one of the plurality of serial port addresses to at least one data transmission, the one of the plurality of serial port addresses to be included in the at least one data transmission to identify one of the plurality of upstream serial bus lanes through which the data transmission was received, the multiplexer to forward data transmissions from the plurality of upstream serial bus lanes to a single downstream serial bus lane; and
a host/device repeater coupled to the host/device system-on-a-chip, including:
a single upstream serial bus lane to receive data transmissions from the single downstream serial bus lane;
a plurality of downstream serial bus lanes; and
a host/device repeater lane controller including a demultiplexer to demultiplex data transmission from the single upstream serial bus lane to the plurality of downstream serial bus lanes.

22. The system of claim 21, wherein the host/device lane controller also includes:
a first register access protocol controller circuit to send and receive control status information over the plurality of upstream serial bus lanes and the single downstream serial bus lane; and
the host/device repeater lane controller also includes a second register access protocol controller circuit to send and receive control status information over the single upstream serial bus lane and the plurality of downstream serial bus lanes.

23. The system of claim 21, wherein the host/device repeater is also to decode the serial port address from the data transmission from the single upstream serial bus lane to determine to which of the plurality of downstream serial bus lanes to forward the data transmission.

24. The system of claim 21, wherein the host/device system-on-a-chip also includes a serial bus port to communicate with the repeater using a first protocol, wherein the first protocol is an embedded Universal Serial Bus specification protocol.

25. The system of claim 21, wherein the host/device repeater is to convert data transmissions from the first protocol to a second, different protocol through which to communicate with the plurality of serial bus devices, wherein the second, different protocol is a Universal Serial Bus specification protocol.

* * * * *